April 23, 1957 F. WARLICK 2,789,472
HYDRAULIC BREECH CONTROL SYSTEM
Filed June 28, 1954 18 Sheets-Sheet 3

INVENTOR.
FRANK WARLICK
BY
ATTORNEYS

April 23, 1957  F. WARLICK  2,789,472
HYDRAULIC BREECH CONTROL SYSTEM
Filed June 28, 1954  18 Sheets-Sheet 4

INVENTOR.
FRANK WARLICK
BY
ATTORNEYS

INVENTOR.
FRANK WARLICK

April 23, 1957  F. WARLICK  2,789,472
HYDRAULIC BREECH CONTROL SYSTEM
Filed June 28, 1954  18 Sheets-Sheet 7

INVENTOR
FRANK WARLICK

BY

ATTORNEYS

April 23, 1957

F. WARLICK 2,789,472

HYDRAULIC BREECH CONTROL SYSTEM

Filed June 28, 1954

INVENTOR
FRANK WARLICK

BY

ATTORNEYS

April 23, 1957 F. WARLICK 2,789,472
HYDRAULIC BREECH CONTROL SYSTEM
Filed June 28, 1954 18 Sheets-Sheet 10

INVENTOR.
FRANK WARLICK
BY
ATTORNEYS

INVENTOR
FRANK WARLICK

April 23, 1957 F. WARLICK 2,789,472
HYDRAULIC BREECH CONTROL SYSTEM
Filed June 28, 1954 18 Sheets-Sheet 15

INVENTOR
FRANK WARLICK
BY
ATTORNEYS

United States Patent Office 2,789,472
Patented Apr. 23, 1957

2,789,472

HYDRAULIC BREECH CONTROL SYSTEM

Frank Warlick, Washington, D. C.

Application June 28, 1954, Serial No. 439,938

4 Claims. (Cl. 89—4)

(Granted under Title 35, U. S. Code (1952), sec. 266)

The invention described herein may be manufactured and used by or for the Government of the United States of America for governmental purposes without the payment of any royalties thereon or therefor.

This invention pertains to a naval type turret gun and more specifically to a new and novel hydraulic control system for the breechblock thereof. It relates to the novel structure and arrangement of parts whereby the breech opening and closing action thereof is fully automatic in the operation of a system which permits more rapid handling and firing of large bore guns than that of guns of similar size heretofore in use.

The mechanical and structural details of the breechblock and the breech housing assembly for which this control system is intended are well adapted for use with rapid fire gun and turret arrangements, of a type as shown, for example, in the copending application to Philias H. Girouard et al., Serial No. 153,262, filed March 31, 1950. Additionally the instant breech control system is adapted for incorporation in a gun and slide hydraulic control system for major caliber rapid fire gun control and operation as shown, for example, in the copending application to David Wertman, Serial No. 502,536, filed April 19, 1955. The subject matter of this invention is partially shown and described in each of the aforementioned applications. However the specific details of the breech control system are not claimed in these copending applications.

In prior art naval turrets mounting large bore guns the incorporation of a powder bag type powder charge for the propulsion of the projectile from the gun has placed certain limitations on the structure and arrangement of the breechblock and the breechblock control mechanisms therefor. The use of this type of powder charge has in prior breech design, necessitated only the movement of the breechblock from a closed position for firing to an open position for breech reception of the projectile and powder bag. Following the ammunition insertion into the gun barrel and suitable ramming therefor, the breechblock is moved back to the closed position for manual locking. With the incorporation of semi-fixed ammunition for large bore applications wherein the powder charge is encased for use, it is desirable to provide a breechblock movement cycle having at least one station in addition to the open and closed stations of manually operated breech arrangements. This position is one slightly below the normal open or ramming position which provides stroking for valve action to actuate the case extractors, the spades of which engage the flange portion of the empty case for removal over the breechblock to a position rearwardly of the gun for subsequent case ejection.

With guns of smaller bore using fixed or semi-fixed ammunition the empty case extraction problem is less significant due to the size relationship thereof and further since the empty case can be manually extracted and disposed of manually. In a large bore rapid-fire application the problem becomes critical due to the increased weight of the empty case. The manual handling of such empty cases would tend to retard subsequent automatic loading operations. Moreover, with rapid fire guns of large bore in which the handling apparatus is automatic or substantially automatic the necessity that all loading cycle functions occur in predetermined and interrelated sequence is of much greater significance.

This invention is directed to the controlling of the sequential functioning of the breech bolt mechanical apparatus for ammunition loading and discharge and in addition is concerned with the provision of a power actuation drive system for the block assemblies from a power source remote thereto as well as hydraulic control over the actuation control units. The system additionally incorporates hydraulic fluid controlled auxiliary units for actuation of the control valve units.

The breech hydraulic control apparatus also incorporates novel arrangements which are advancements over the breech system of the copending application to George A. Chadwick et al., Serial No. 467,182, filed November 28, 1942.

The guns incorporated in the mounts of the turret with which the present breechblock control system invention is associated are well adapted for use with semi-fixed ammunition rather than the powder bag type of ammunition previously used in guns of similar large bore. The incorporation of the semi-fixed ammunition as handled by the structural embodiment of this type of turret makes provision for the reception in the gun breech of two load increments, viz., a projectile, and a powder case, positioned for ramming at the rear of the gun slide assembly and interiorly thereof in alignment with the gun bore. This position generally designated as the ramming position is advantageously arranged to permit cooperative and simultaneous ramming of the two increments over the breechblock into the forward position thereof in the gun breech. The hydraulic system with which this invention is concerned is a part of the control and actuation system for the mechanical movements of gun ramming but the system is concerned with providing the power actuation for movement to a breech aligned position for the load increments at gun ramming wherein the breechblock is adapted to permit passage thereover of a chain rammer of the system. In addition to this actuation the hydraulic power is so controlled as to maintain the positioning during this and subsequent operations and to provide movement upwardly from the ramming position to a breech closed position for gun firing. Following gun firing the power system provides actuation and control over the breechblock and opening action thereof, in dropping to a breech open or empty case extraction position. It is additionally adapted to provide interlock control action for a rammer hydraulic control system when used therewith.

The power drive instrumentalities thereof are normally semi-automatic in their operation and when so operated are hydraulically actuated. Suitable interlocks are incorporated in the systems associated therewith to provide the system with insurance that the proper sequence of operation is provided to prevent improper firing of the gun. With the incorporation of such interlocks and with the additional correlation of the breechblock controls with controls of the empty case extractor units the operation is substantially automatic and requires only the proper operation of the hydraulic system associated therewith to provide or suspend operation as may be desired.

The breechblock control system is an assembly which receives its drive from an accumulator type pressure system in which the hydraulic fluid drive energy is provided by an electric motor-driven pump assembly. This hydraulic power plant in the preferred embodiment of this system or any other suitable source for supplying the necessary hydraulic energy to the accumulator unit and subsequently to the control and actuation units of the breechblock drive cylinder is securely affixed to the platform which forms a part of the gun turret structure. This fluid supply from the hydraulic energy source is delivered through a manifold system and suitable swing joint units to the accumulator which is mounted on the gun slide and arranged to supply fluid to the breechblock control through a second manifolding system and a sliding joint arrangement provided on the gun housing as a telescoping connection between the gun slide and the housing which moves with the gun in recoil and counterrecoil. This arrangement advantageously provides for the arrangement of all hydraulic drive units on the gun slide, and more particularly the breech control and actuation unit on the breechblock housing. This eliminates the necessity for complicated mechanical drive and link units between the gun slide and housing.

The fully controlled handling of breechblock raising and lowering movements are controlled by structure at or near the point of the desired function. The above mentioned necessity for mechanical drive links is thus eliminated and the necessary energy for operational movement is applied by the hydraulic fluid system from the accumulator to the hydraulically operated system components at or relatively close to the point of power application.

It will be obvious that the breechblock operating mechanism is located as a matter of convenience on the housing rather than on the slide assembly proper. Suitable coupling means between the housing and the hydraulic fluid supply of the accumulator is provided by the hereinbefore recited sliding joint arrangement comprising telescoping tubes and packing boxes theresurrounding in fluid communication between the aforementioned supply and the control valves for the breechblock cylinder. This permits the structural elements thereof to be adapted for movement in recoil and counterrecoil with continuous application of fluid pressure thereto during such movement. The fluid flow function which is accomplished by the sliding joint provides constant energy as needed at the hydraulic cylinder and at the same time permits longitudinal movement of the gun and housing without interruption or interference of this control fluid flow or the building up of excessive back pressure with the return to battery condition following recoil and counterrecoil action. As set forth in the hereinbefore recited application to David Wertman the supply of the fluid medium to the manifold is automatically re-established after partial discharge of the accumulator whereby the power plant supplies a variable amount of energy which increases with the simultaneous operation of certain hydraulic units thereof of the system in the gun operation cycle. This advantageous arrangement of the accumulator in the system whereby the motor operates continuously to drive the pump so that at idling condition a small flow is produced through the accumulator with availability of greater supply as demand is placed upon the accumulator through operation of a plurality of the hydraulic units of the system is such as to prevent fluid starvation at any control point including those control functions with which this invention is associated and which are structurally mounted on the gun housing.

This hydraulic unit which operates the breechblock includes a cylinder assembly having a piston therein with its piston rod connected to the breechblock. The assembly is supported by the gun housing in a manner whereby the piston is attached to the breechblock structure of the gun mechanical system and the piston attached thereto is received in the cylinder and adapted for longitudinal movement therein. The control system therefor includes a directional control unit interposed between the cylinder and the hydraulic energy source to provide bi-directional operation of the piston within the cylinder during closing and opening cycles of breechblock operation by providing fluid flow to longitudinally opposed reaction surfaces of the piston. This bi-directional operation of the piston within the cylinder during closing and opening cycles of block movement is controlled by a unit which includes a valve assembly thereof adapted for shiftable movement to alter the path of flow to an upper or lower operating surface of the piston within the cylinder. This system conventionally includes a valve assembly which is shiftable by the mechanical linkage assemblies thereof. The manual operating units of these assemblies are more fully described in the hereinbefore recited application of Girouard et al., wherein the breechblock bolt is actuated upon breech movement to lock and is additionally controlled in unlocking action by lever means which positions the sliding valve assemblies. In addition to this pair of valves which serve to control the direction of flow of the hydraulic fluid in a cylinder the system includes a valve, actuatable by the breechblock in opening action to cause one of the pair of valves to terminate the flow of hydraulic fluid from the source to the first mentioned valve to the cylinder.

The breechblock is arranged to move to a position somewhat beyond its loading position below the gun bore to operate the control device for the empty case extractor. Thereafter, the extractor ejects the empty powder case rearwardly from the gun barrel into the mechanical transfer assembly of the empty case ejecting system. In a preferred embodiment of this system a hydraulically actuated control device is provided for operation of the empty case extractor. This device is one which provides fluid flow to the piston assembly of the extractor for movement of the case engaging spade elements thereof. Movement of this piston by manual means as provided by the gun mechanical system necessitates resetting of this automatic control valve of the extractor system. This resetting is provided by a manual lever arrangement which merely resets the valve to permit actuation of the extractor cylinders and the spades thereof by subsequent breechblock dropping action.

The invention is capable of use in either large or small bore gun systems but is additionally well adapted for use with large bore guns such, for example, as an 8" rapid fire turret unit. A gun having a rapid rate mechanical handling system, including hoisting and cradle transfer assemblies of the type adapted to load the transfer trays of the gun slide at any angle of elevation when combined with the improved hydraulic-control actuation system of the present invention has been found to satisfactorily provide breechblock operation at high firing rates for the projectile and at a more rapid rate than that heretofore obtainable in large bore guns.

In light of the foregoing, it is a feature of the present invention to provide power actuation for breechblock movement in positioning it for gun loading and for empty case disposal from the above described major caliber guns in which the breechblock closing is arranged to follow substantially at the instant of completion of load increment ramming and which is rendered active again immediately following firing to provide breechblock dropping for empty case extraction.

One object of the present invention is the provision of a fully automatic hydraulic control and power actuation system for a breechblock assembly which is operable in a gun loading and firing system and in which many of the foregoing disadvantages are obviated and which is adapted to perform satisfactorily all the essential functions of the systems heretofore or now in general use and in which the possibility of apparatus malfunction or failure is reduced to a minimum and additionally wherein personnel malfunction is reduced to zero.

An additional object of this invention lies in the provision of a rapid fire rate actuating system and mechanism therefor for a breechblock of a gun mount unit and which Referring now to Fig. 9 for a more detailed showing, the breech operating cylinder 1 is keyed and bolted in the breechway of the gun housing with the piston rod end 5 thereof attached to the bottom of the breechblock by the flexible threaded connection 7. It is secured against loosening by the lock nut 8.

The piston which moves longitudinally in the cylinder is arranged to operate between open and closed positions of the breech, upon reception thereby of hydraulic power fluid through the valve and pipe connections hereinafter described in greater detail. The breech operating cylinder assembly 10 consists of the cylinder 1, a cylinder head 9, two large coil springs 6 and 11, the piston head 12, a buffer pin 13 and valves and restrictions for controlling and regulating the piston stroke. The arrangement is such as to provide a normal opening or breechblock lowering stroke and an additional stroke movement to a maximum position a fractional part of an inch therebelow. The stroke movement is performed in two stages for the closing action of the breech with an initial movement of approximately ¾" to the ramming position and a wedging stroke of, for example, 12". The cylinder construction is generally that of a cylindrical tube 14 having fitted internally therein a liner 15 and externally shaped therewith with an integral upper cylinder head portion 9 and a mounting flange 17 therefor. The upper head portion 9 is provided with a cylinder head insert or the like in the bore thereof to provide a reaction surface for the upper piston reaction surface of piston head 12. The lower cylinder head 18 for piston head 12 is a separate element which is connected in a flange bolted relationship to the cylinder with a seal 19 therebetween. The hollow piston is of integral rod construction having the connection fittings hereinbefore described for connection with the breechblock. The nut arrangement at the breechblock 2 is of a special type providing slight flexibility between the coupled breechblock and the piston. Piston 5 is arranged in a sliding relationship whereby it moves through chevron-type packing 20 which is secured in the cylinder upper end by the packing nut 21. The lower end of the piston is cylindrical with the tapered piston head portion 12 thereof fitted with a single O-ring 22 for internal threaded reception of the fitted flanged sleeve nut 23. This sleeve nut retains the hollow buffer pin 13 in a sliding relationship whereby it functions to compress the two large springs 6 and 11. The springs are compressed near the end of breech opening movement when the buffer pin registers with the hollow seat 24 in the lower cylinder head. It functions to check breech opening and to provide for the storing of sufficient energy at the end of the stroke to raise the block to the ramming position therefor.

The valve arrangements associated with the piston for application of pressure thereto at each cylinder head and for the additional purpose of by-passing and throttling displaced fluid at the opposite sides of the piston are provided through their relationship with an external pipe line 25 which connects the lower cylinder-head port 26 to the top chamber 27, Fig. 10, of the spool type spring-loaded differential valve 28 in the upper head thereof. Two ball check valves 29 and 30, Fig. 9, a piston-type check valve 31 and an adjustable restriction 32 are additionally provided in the upper cylinder head and function in a manner as hereinafter stated in greater detail with reference to the description of the mode of operation of the system.

The lower cylinder-head unit is provided with a dash pot hole 33 and an adjustable restriction 34 of a needle and screw type. The sleeve-type adjustable check valve associated therewith is shown at 35.

In addition to the breech operating cylinder, the system includes the five additional hydraulic units comprising the valve block 36, Figs. 4, 5 and 7, cylinder 37, Fig. 6, and the sliding type joint unit 4, Fig. 8, which is mounted between the gun housing and slide for fluid communication between the accumulator connection 127 which serves as a fluid source and the breech units. A second connection 38, Fig. 8, is also included therein for return flow to the tank of the system.

The sliding joint 4 of Fig. 8, is a sub-assembly for use with this system which provides the hydraulic pressure and return-line pipe connections between the equipment on the slide and that of the housing. The telescopically arranged parts thereof are adapted for recoiling movement with the equipment on the housing. It consists of two telescoping tube asemblies 39 and 40 respectively attached to port connections 41 and 42 in the breech operating valve block, and the supporting brackets 43 and 49 therefor which are bolted to the slide in a manner according to that shown in Fig. 1. The design thereof is such as to provide a telescoping pipe connection of adequate travel and of sufficient sealing effect to maintain a pressure type connection throughout maximum gun recoil-counterrecoil movement. Each installation is accurately fitted to give alignment parallel with the recoil line of travel of the housing assembly on the slide.

The sliding joint comprises the fixed unit 44 and the movable housing unit 45 for tube sections 39 and 40 thereof. The fixed unit consists of a cylinder head 46, a pair of cylinders 47 and 48 and two mounting brackets 43 and 49 which are assembled into a unitary assemblage. The pair of sliding tube elements 39 and 40 are telescopically received within the cylinders of the fixed unit 44 and are maintained in fluid tight relationship therewith. A pair of gland nuts 50 which compress neoprene rings, not shown, at 51 seal the opposite ends of the two tubes to the breech operating valve block housing assembly.

The movable housing unit 45 comprises the housing 44, a one piece nut 52, a pair of adapter-retainer elements 54 and 54', a pair of seals 61 and 53 for each of the sliding tubes 39 and 40, and a shim-gasket combination 55. The gasketing arrangements further include two groups of chevron type packing rings 53 assembled in opposed arrangement in the cylinder head to provide fluid seal between the housing 44 for the fixed cylinders 47 and 48 and the tubes 39 and 40. The outer seals 61 are separately retained by the cover glands assembly of nut 52 and the adapter-retainers 54. The double one piece screw retained nut 52 is adjustably seated with respect to the housing 44 by a laminated shim-gasket at 55. This arrangement permits take-up adjustment of the chevron packing.

The ball and spring type check and by-pass valve assembly 136 for port 56 comprises the ball 57 and spring 58 and is installed in the closed end at 59 of the housing 49 of Fig. 8 to prevent overloads in the pressure side of the assemblage during counterrecoil whereby fluid may escape therefrom. This valve is arranged to open and allow fluid to flow from the pressure tube into the return tube as the sliding tubes return into the housing. The pipe union coupling nuts 50 provide the attachment between the two sliding tubes 39 and 40 and the breech operating valve as hereinbefore stated.

The breech operating valve assembly 3 on the gun housing is assembled in a manner shown in Fig. 1 and is located at the lower end of the breech assembly. It serves as a housing for the three principal valves viz., valves 62, 63 and 64 of Figs. 4 and 5. It additionally houses the supplementary hydraulic elements associated therewith which control opening and closing of the breech and extracting action of the empty cartridge-case extractors. This unit is in fluid communication with the slide equipment of the circuit of Fig. 2 as hereinbefore indicated and with the breech operating cylinder and the two extractor cylinders 65 and 66. It is mechanically connected with the breech bolt and the hand mechanisms for breech operation, in a manner as shown in greater detail in Figs. 17/18, and details not part of this invenis adapted through hydraulic interlock control to provide automatic predetermined sequential operation in the gun loading and handling cycle of the system of a gun for turret use.

Another object of this invention is the attainment of new and improved automatic gun loading control through the cycles associated with breechblock action without manual intervention and in a time sequence relationship with the functions of ramming, firing, extracting and breech closing.

An additional object of this invention lies in the provision of a control and actuation system adapted for use with a mechanical handling system for semi-fixed ammunition.

Another object of the invention lies in the accomplishment by improved means of breechblock positioning and maintenance of such position during ammunition ramming transfer action accompanied with subsequent ramming chain retraction and thereafter subject to positioning to move the breechblock upwardly and permit mechanical breechblock locking action.

Additionally it is an object of this invention to provide the breechblock holding functions as recited in the immediately prior object through any position of the gun in elevation.

Additionally, it is an object of this invention to provide power actuation means for the mechanical actuation of power and flow control valves of the breechblock control system to permit rapid movement thereof in controlling the breechblock movement and to provide position maintenance thereof for a predetermined period of time and until accomplishment of a correlated gun system cycle.

Another object of the present invention is that of providing a hydraulically actuated automatic drive system for movement of the breechblock and to additionally provide valve controlled response actuation of associated hydraulic-mechanical apparatus of the gun turret following given steps of the cyclic actuation of the breechblock.

In correlation with the immediately preceding object regarding control of subsequently operated gun control and actuation apparatus, it is also an object of this invention to provide control of the succeeding breech operation in response to completion of a gun operation cycle as performed by said other hydraulic-mechanical actuation units.

Still another object of the invention lies in the application of hydraulic power and hydraulic control apparatus to a new and novel breech order cycle in response to movement thereof and the automatic control of succeeding steps of the cycle.

A still further object of the present invention lies in the provision of hydraulically actuated automatic power and control apparatus for gun turret breechblock operation in the housing thereof of the character stated in which suitable hydraulic interlock devices are provided in the fluid system thereof to insure the proper sequence of operation between the component parts of the mechanical actuating elements in a gun loading system of the type for which the invention is intended and in which the source of hydraulic energy for the apparatus is constantly available at sufficient pressure to accommodate peak loads occasioned by joint movement or excessive loading encountered in service operation of the elements thereof and which is arranged to prevent excessive overloading in normal operation thereof.

It is among other and still further objects of the present invention to provide novel hydraulic drive units for use in the automatic breech loading cycle and to provide a novel manual or semi-automatic hydraulic unit for operating and closing the breechblock.

Additional objects and advantages of this invention will be apparent from the following description of a preferred embodiment, and the same will be readily appreciated as they become better understood by reference to the following detailed description of the said preferred embodiment and the accompanying drawings wherein.

Figure 1:
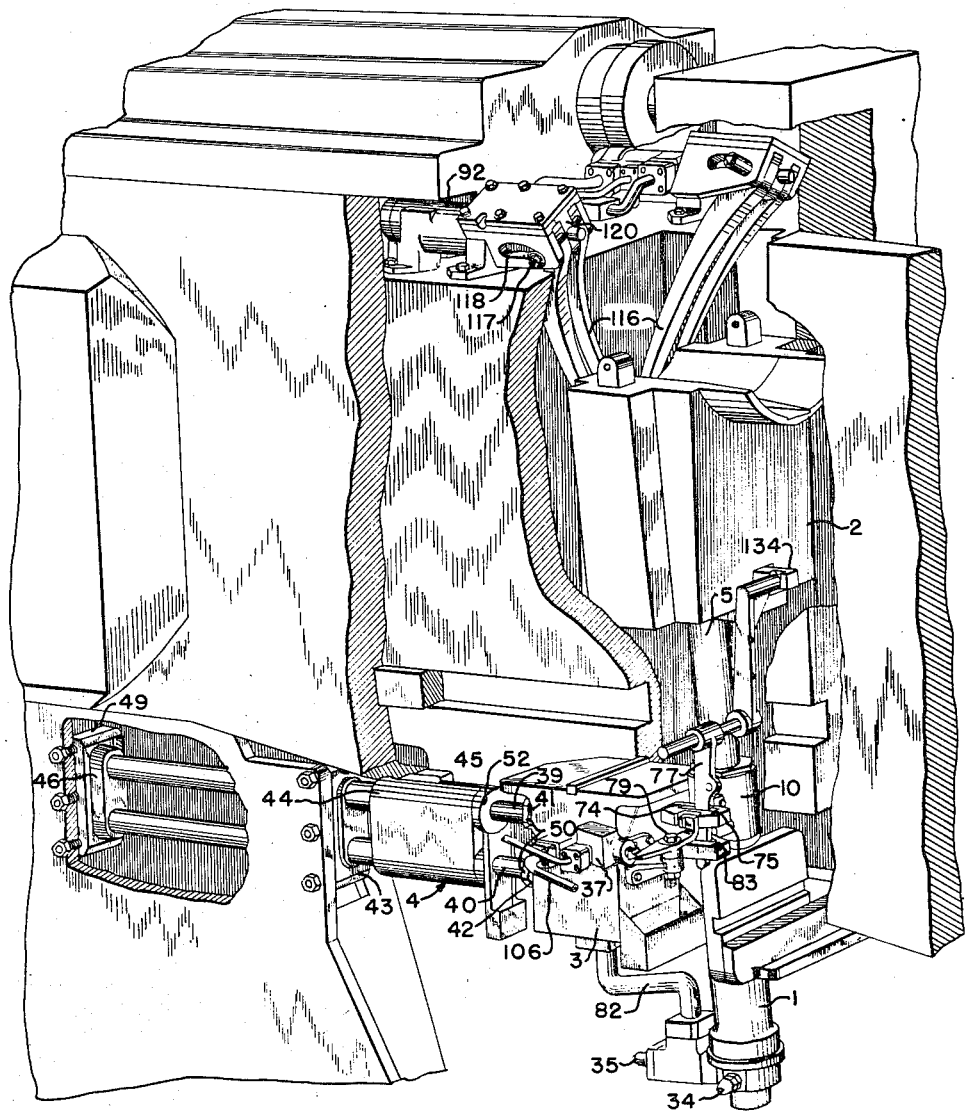
Fig. 1 is a pictorial view showing the assembled relationship of the breech operating mechanism and the empty case extractor mechanism associated therewith.

Referring now to Fig. 1 in which the assembled relationship of the breechblock and breechblock actuating system is shown from the left-hand side thereof, the unit comprises the breech operating cylinder 1 connected to the underside of the breechblock 2 for transverse movement thereof under hydraulic fluid action. The showing of Fig. 1 additionally illustrates the assembled relationship of the control valve housing 3 and the sliding joint assembly 4 which provide hydraulic fluid flow and control for the breechblock operating cylinder 1.

Figure 9:
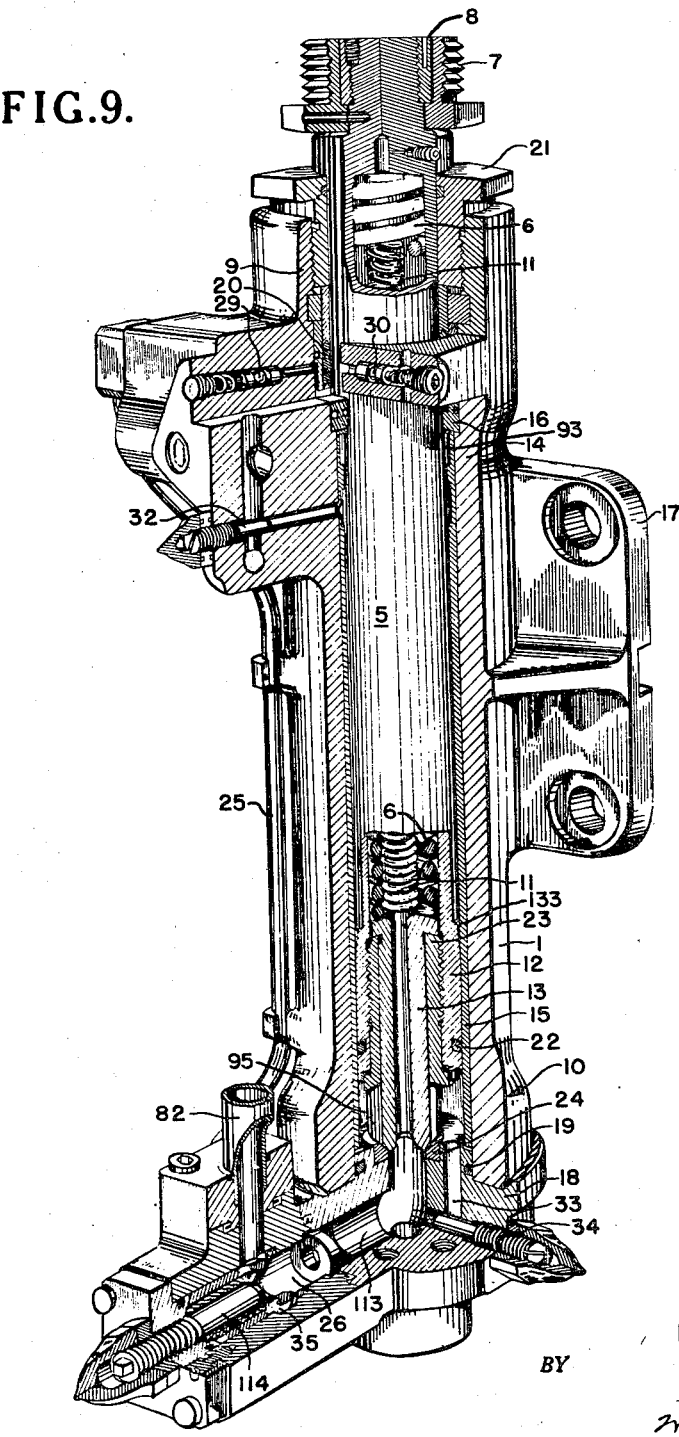
Fig. 9 is a pictorial view in section showing the internal details of the breech operating cylinder.
Figure 10:
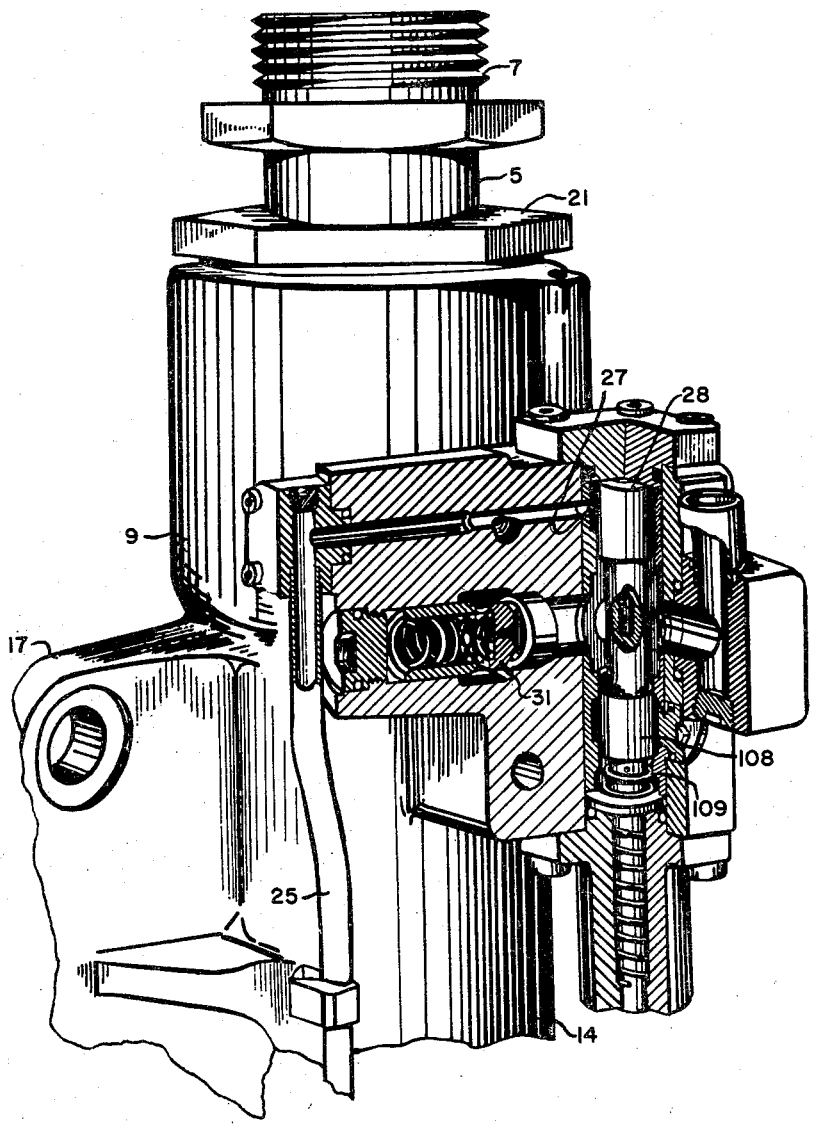
Fig. 10 is a fragmentary view with parts thereof in section showing the upper breech operating valve block of the breech operating cylinder of Fig. 9.

The breechblock operating cylinder of Figs. 9 and 10 incorporates the breechblock actuating piston rod 5 having a spring 6 in the interior thereof, with attachment arrangements on the rod 5 whereby the upper end of the breech cylinder is attached to the beechblock.

tion are shown in the drawings of the copending application to Girouard et al. supra.

Figure 2:
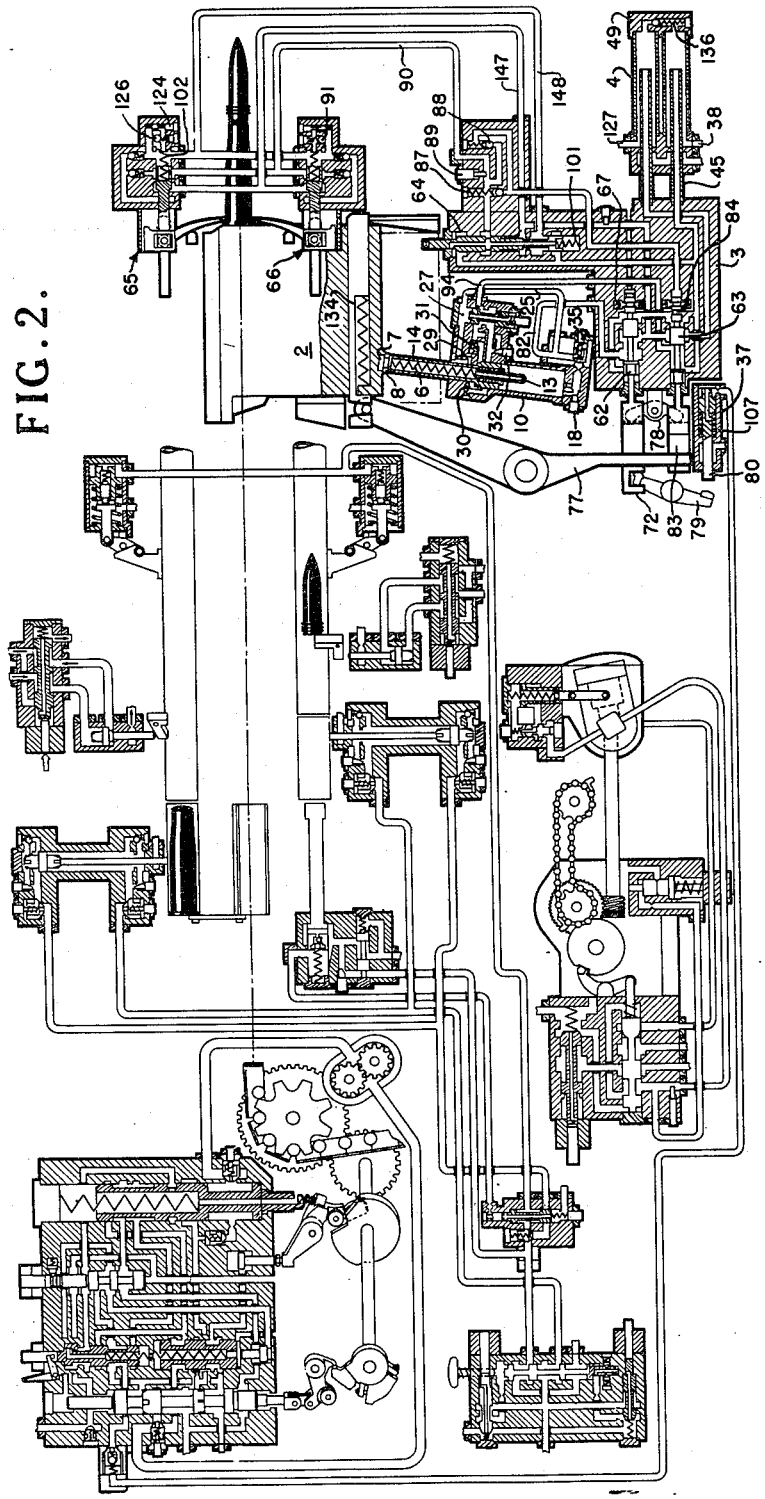
Fig. 2 is a diagrammatic illustration of the entire system in which the breechblock hydraulic system is adapted for incorporation.
Figure 3:
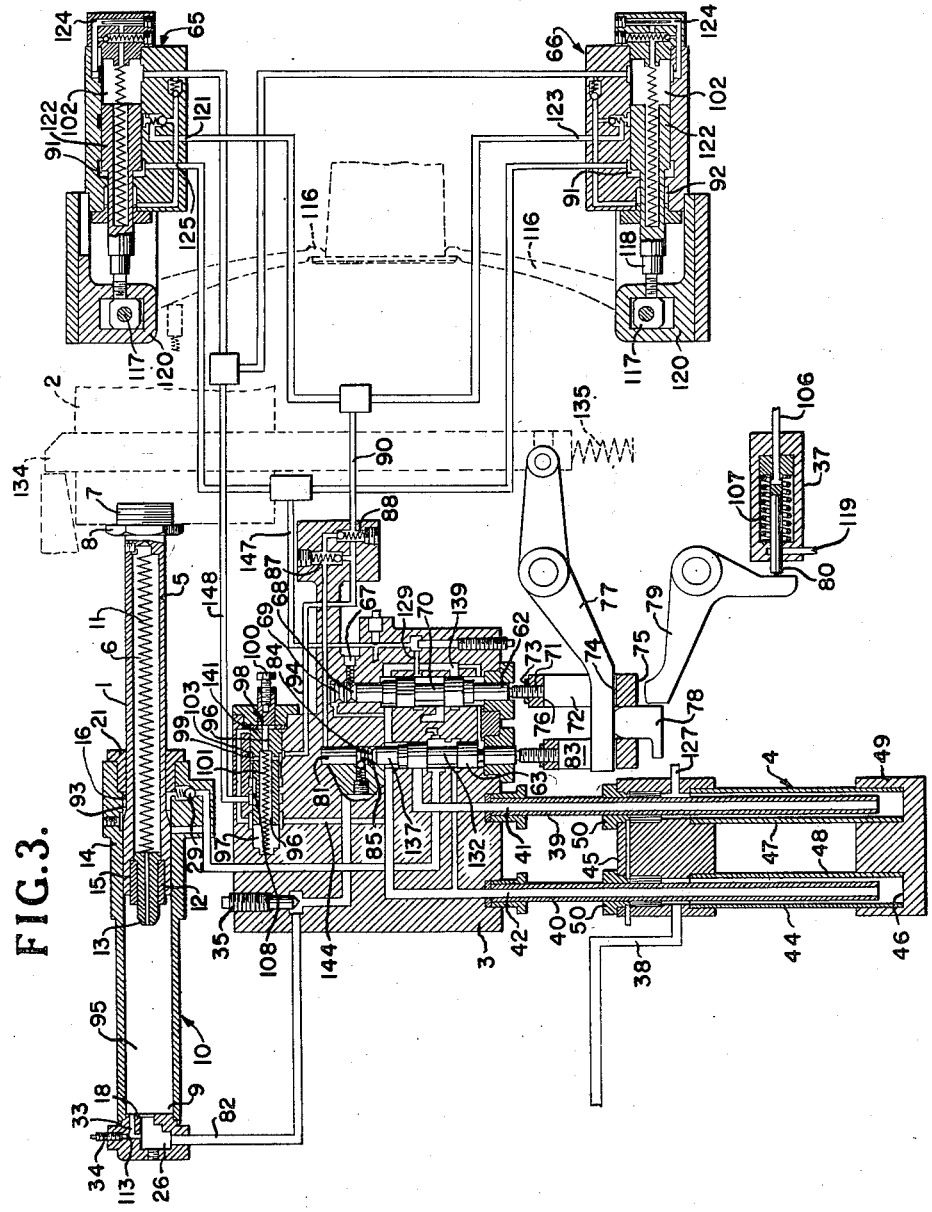
Fig. 3 is a diagrammatic illustration of the hydraulic circuitry of the breechblock and control system therefor.
Figure 7:
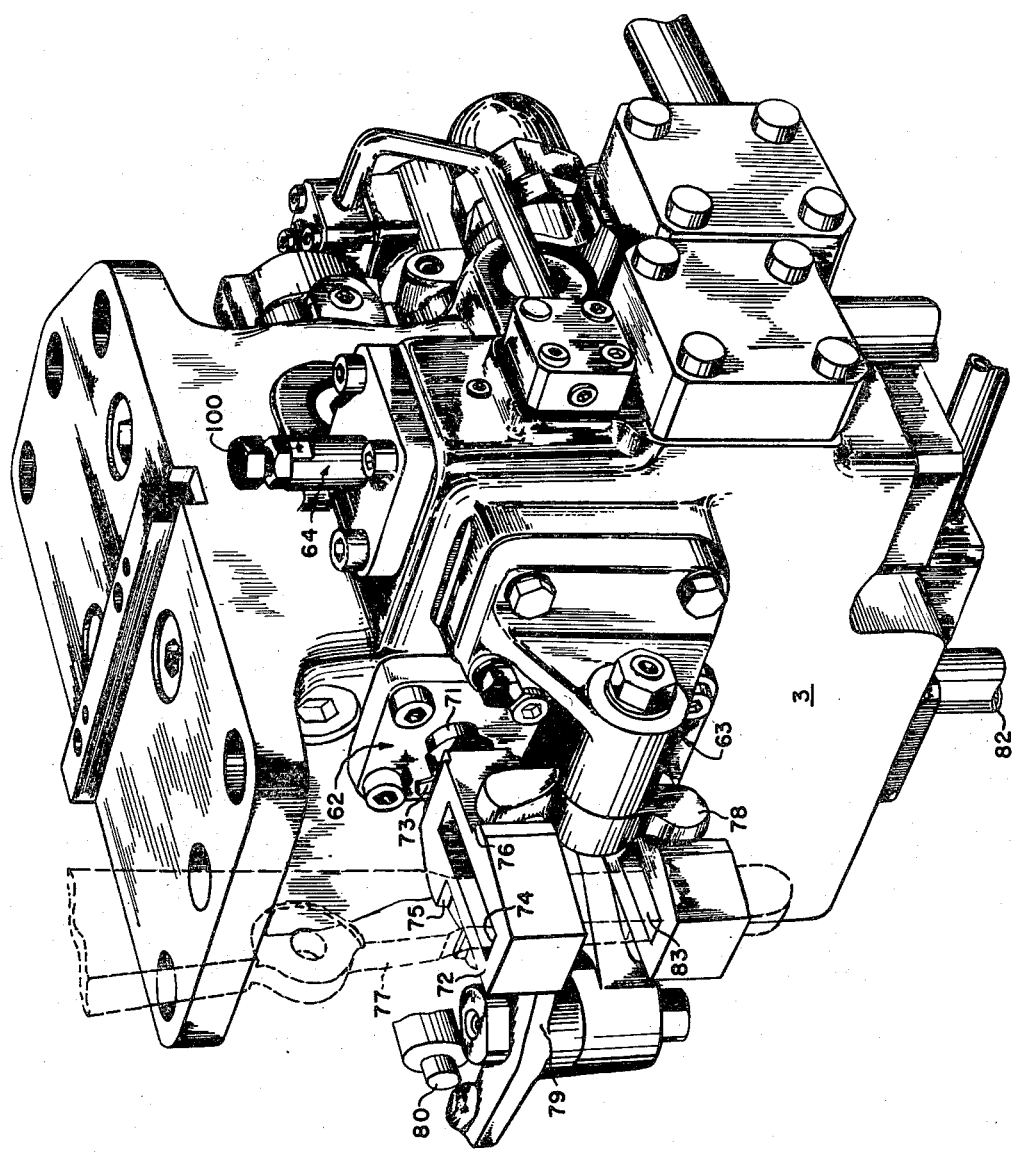
Fig. 7 is a perspective view of the breech operating valve block showing the general arrangement of the mechanical actuating devices for the valve members thereof.
Figure 8:
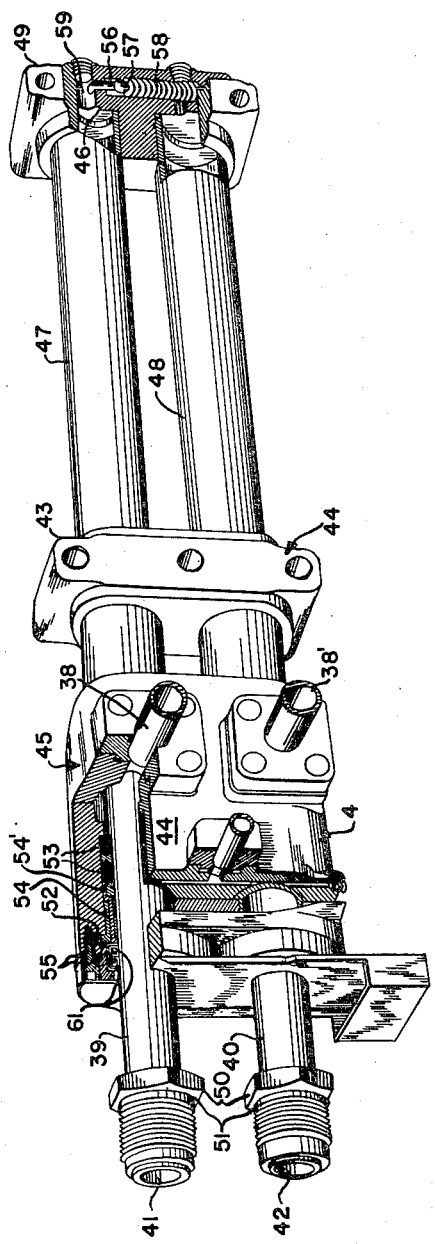
Fig. 8 is a pictorial view of the sliding joint assembly for use therewith.

Referring now to Fig. 3 for a functional presentation of a first embodiment of the invention, there is shown the valve 62 which is a two-position mechanically actuated spool type unit adapted to be held by spring-detent 67 in either of two positions thereof by engagement of the detent in the groove 68 or 69. The arrangement is such that the stem 70 passes through the block and is provided with a threaded extension 71 thereon for connection with a valve actuating guide block 72. This block is thus made adjustable with respect thereto and is adapted to be locked by the nut 73. The mechanical linkage assembly for combined operation of this valve 62 and valve 63 by movement of the valve guide is shown diagrammatically in Fig. 2. Also it is shown in the engaged relationship in Fig. 7. It includes the loop shaped piece 72 which is provided with surfaces at 74, 75 and 76, Fig. 3, for actuation by the valve operating link 77 and two other levers 78 and 79 of Fig. 7.

The actuating lever 77 which engages at 74 is actuated by the breech bolt, while the other two levers comprise the rocker arm lever 78 which actuates the valve at the surface 76 and the closing valve operating lever 79 which engages lugs in the opposite sides of the loop as shown at 75 of Fig. 1 and as shown schematically in Figs. 2 and 3.

The breech bolt lever is provided with operating clearance within the loop of the valve guide 72 for the lever 77 which does not directly actuate the valve. This lever does, however, function indirectly to move valve 62 through action of the rocker arm lever 78. The arrangement of this lever is such as to operate to move the valve 62 when valve 63 is mechanically actuated. It does not, however, move valve 62 when valve 63 is hydraulically operated in the automatic cycle of operation.

Figure 6:
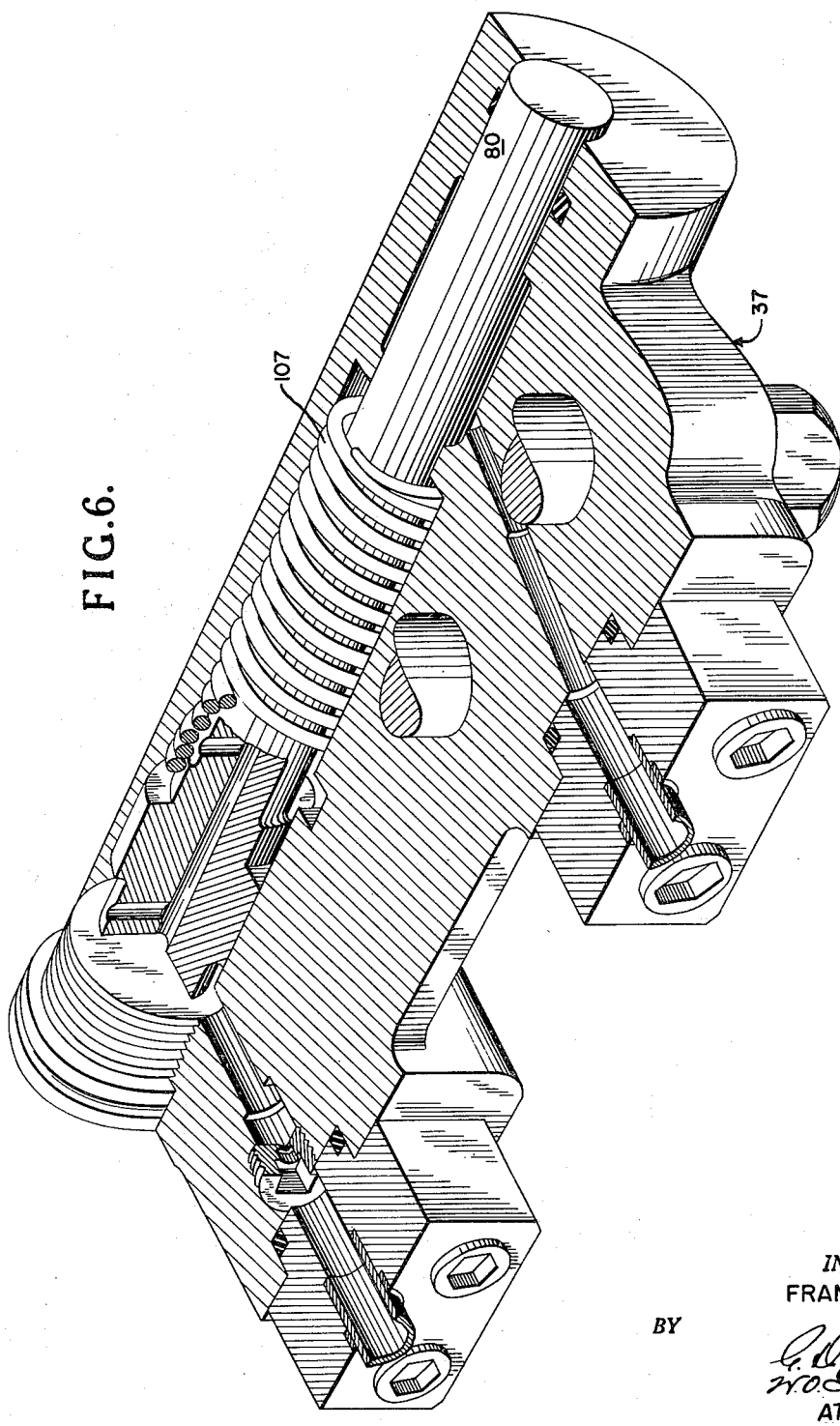
Fig. 6 is a pictorial sectional view of the breech closing valve operating cylinder.

The closing valve operating lever 79 which engages the surface 75 actuates valve 62 in an inward direction, when it is pushed by plunger 80 of the valve operating cylinder at 37 of Fig. 6. The valve 62, when tripped inward or toward the gun muzzle, is in breech closing position. This position is such as to port pressure through pipe 82 to the bottom chamber 26 of the breech operating cylinder head 18. In the other position thereof, the valve vents the upper chamber 27 of the cylinder head at 16.

Breech opening action is controlled by valve 63 whereby the action is in addition to the two supplementary control actions thereof as hereinafter related in greater detail. Valve 63 is a two-position, spool type unit of similar construction to that of valve 62 which substantially similar valve guide and detent arrangements at 83, 84 and 85, respectively. The forward end thereof does not, however, pass through the valve block as is the case with the spool of valve 62. Moreover, it differs therefrom in the additional manner that the actuating guide arrangement 83 is actuated by lever 77 for mechanical positioning in addition to the hydraulic control operation provided therefor.

A mechanical movement of this valve occurs in correlation with breech bolt unlocking action. The action of operating lever 77 with breech bolt unlocking is transmitted through the loops 74 and 83 of the valve guides of both valves without actuation of valve 62 as the lever passes the movement to the guide 83 for valve 63. The forward end of the lever engages the valve guide to thrust the valve spool inward to the inner detent position thereof at 84.

Figure 4:
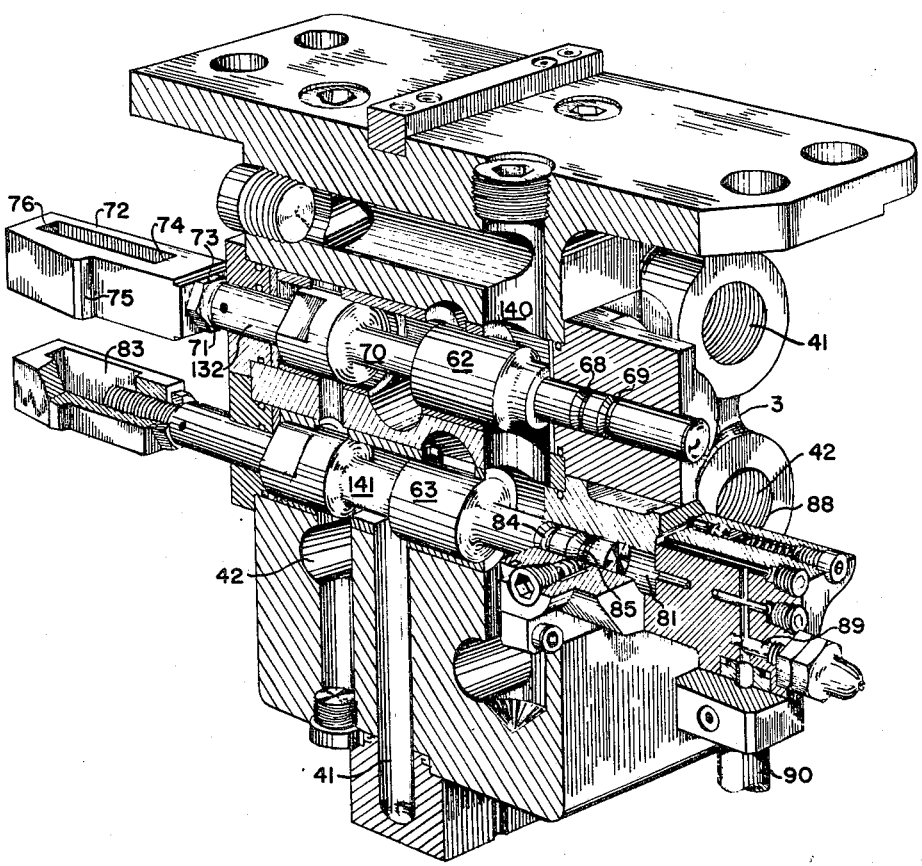
Fig. 4 is a sectional pictorial view of the breech operating valve showing a section through the breech opening and breech closing valve members.

Hydraulic movement of valve 63 is accomplished by the end chamber arrangement shown in Fig. 4, by control features of the extractor cylinders associated therewith in the system, and the extractor control valve 64. The end chamber arrangement includes two spring-loaded ball check valves 87 and 88, and preferably includes an adjustable restriction not included in the embodiment of Fig. 3, but shown as controlled by the needle-type restriction device 89 of Fig. 4. The end chamber arrangement additionally includes the pipe connection for line 90 which runs to the rear or piston rod chambers 91 of both extractor cylinders 65 and 66. The two check valves are located in opposed positional relationship in the lead passages which connect this pipe with valve 64 and the end of valve 63. These details provide control actions, the purpose for which is that of positioning valve 63 after the movement of the breech to fully open condition in a manner whereby the breechblock is permitted to move upward approximately ¾ in. from the lowermost or fully open position to the ammunition ramming position with the ammunition guide surface in alignment with the gun bore.

As valve 63 moves under action of hydraulic fluid flow, valve 62 is in the outer detent position thereof which permits venting of the bottom chamber or port 26 of the breech operating cylinder. As a consequence thereof, valve 63 is hydraulically positioned without mechanical action of the rocker arm lever 78. Since the rocker arm lever 78 is not actuated, the valve 62 remains in the outer detent position thereof. Valve 63 when at the inward or forward detent position ports pressure to the upper end chamber 93 of the breech operating cylinder through line 94. When positioned for engagement by the outer detent 85, it vents the chamber to the tanks. It is apparent that at the hydraulic movement of valve 63 both end chambers 93 and 95 of the breech operating cylinder 1 are vented to the tank.

Figure 5:
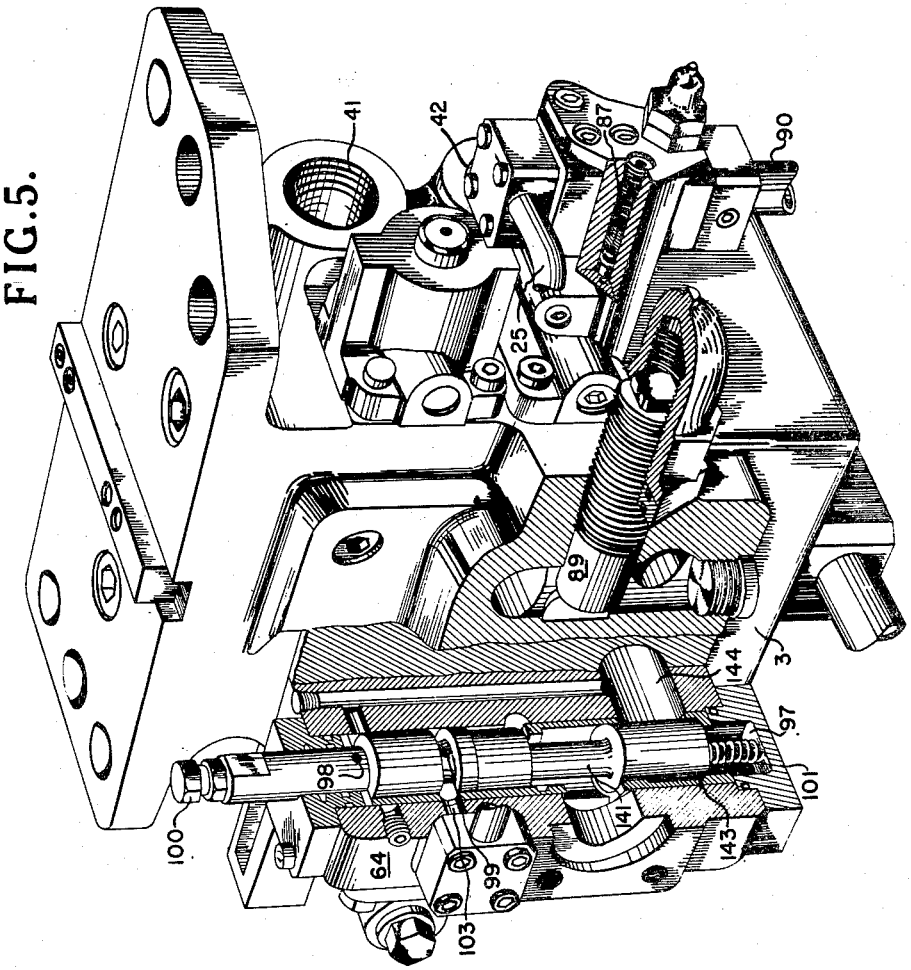
Fig. 5 is a pictorial fragmentary view of the breech operating valve block of Fig. 4 showing in section details of the extractor control valve.

The spring-loaded mechanically actuated spool-type valve 64 controls breech-mechanism extracting action. This valve functions in conjunction with valve 63 and the extractor cylinders 65 to control the slight upward movement of the breechblock when the block moves to ramming position. It is vertically positioned as shown in Fig. 5 with the upper end thereof located in the path of travel of the bottom of the breechblock. The valve construction is such as to include a longitudinal internal passage 96 thereof to connect the spring chamber 97 with two vent holes at the upper end thereof at 98 and 99 located functionally as indicated in Fig. 3. The adjustment screw device 100 located in the upper end of valve 64 provides for an actuation adjustment to vary the conditions effecting the stroking action of the valve. A critical position of the valve element 64 is the completely up-position as provided by action of spring 101 whereby the breechblock is positioned at ramming position. The valve 64 when depressed, vents the spring chambers 102 of the extractor cylinders 65 and 66 to the tank to initiate extractor spade movement. When the valve 64 is positioned at the upper position thereof it ports fluid under pressure to both end chambers 91 and 102 of both extractor cylinders 65, to maintain equilibrium therein until subsequent relief porting of the spring chambers 102 with the subsequent operation cycle, to again provide extractor actuation.

The internal passage 96 of the valve 64 functions at all times to vent the spring chamber 97 below valve 64 through fluid communication with the upper vent hole 98. The lower of the two vent holes is located at an intermediate port 103 whereby the end chamber of valve 63 is vented when valve 64 is at the up-position. Venting action of this valve occurs through the ball-check valve 87 of the valve 63. This vent is closed when the breechblock is down and valve 64 is depressed. This arrangement permits pressure to be ported from the extractor cylinders 65 at the end of the extracting action in addition to permitting it to be throttled through the restriction of adjustment 89, Figs. 12 to 17, and the other ball-check valve associated with valve 63 and located at 88 to the end chamber 81 of valve 63. The function of valves 64 and 63 in controlling fluid flow provides hydraulic power actuation of the breech operating cylinder 1 for movement of the breechblock to ramming position, as well as release of valve 64, and the porting of fluid pressure to the forward chambers 102 of the extractor cylinders 65 for retracting action of the extractor spades.

The breech closing valve operating cylinder 37 of Fig. 6 is a small cylinder block unit 104 and plunger assembly 105, mounted on the slide to provide thrust actuation of the closing-valve operating lever 79 for movement of valve 62 to the inward detent position thereof. It is pressure-operated by fluid flow from the connection 106 of the piping system and is provided with a spring 107 for plunger return positioning as shown in Fig. 2. The cylinder does not recoil with the gun and the attached breech operating valve block by virtue of the mounting provision therefor on the gun slide. It is located as shown in Fig. 1 in a manner whereby the plunger 105 thereof is in alignment and has a small gap with respect thereto with the valve operating lever 79 when the gun has completely returned to the in-battery position.

Figure 16:
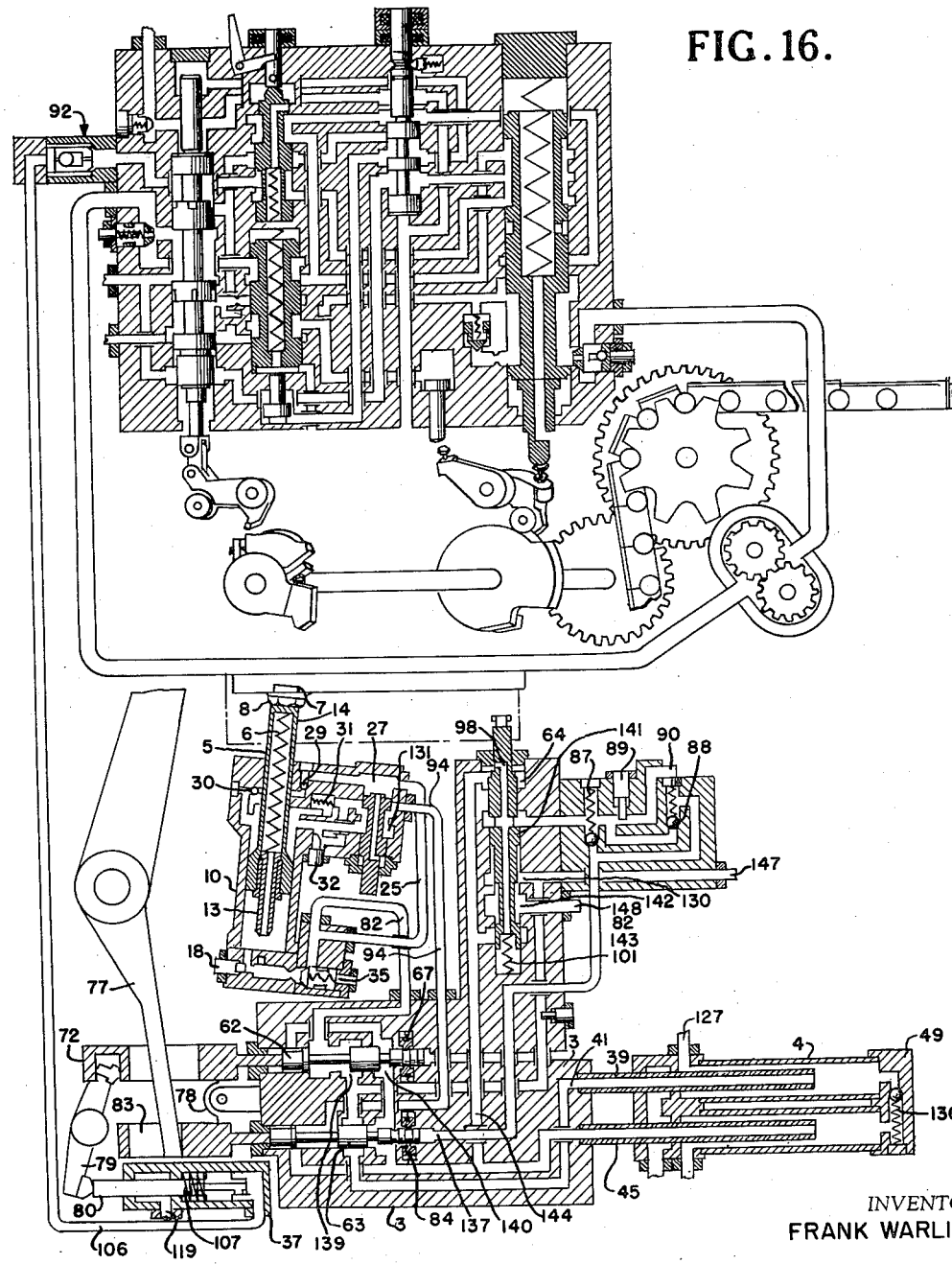
Fig. 16 is an operational diagrammatic illustration of the breechblock hydraulic system in conjunction with a rammer hydraulic system adapted for use therewith and showing the condition of the system just prior to breech closing action.
Figure 17:
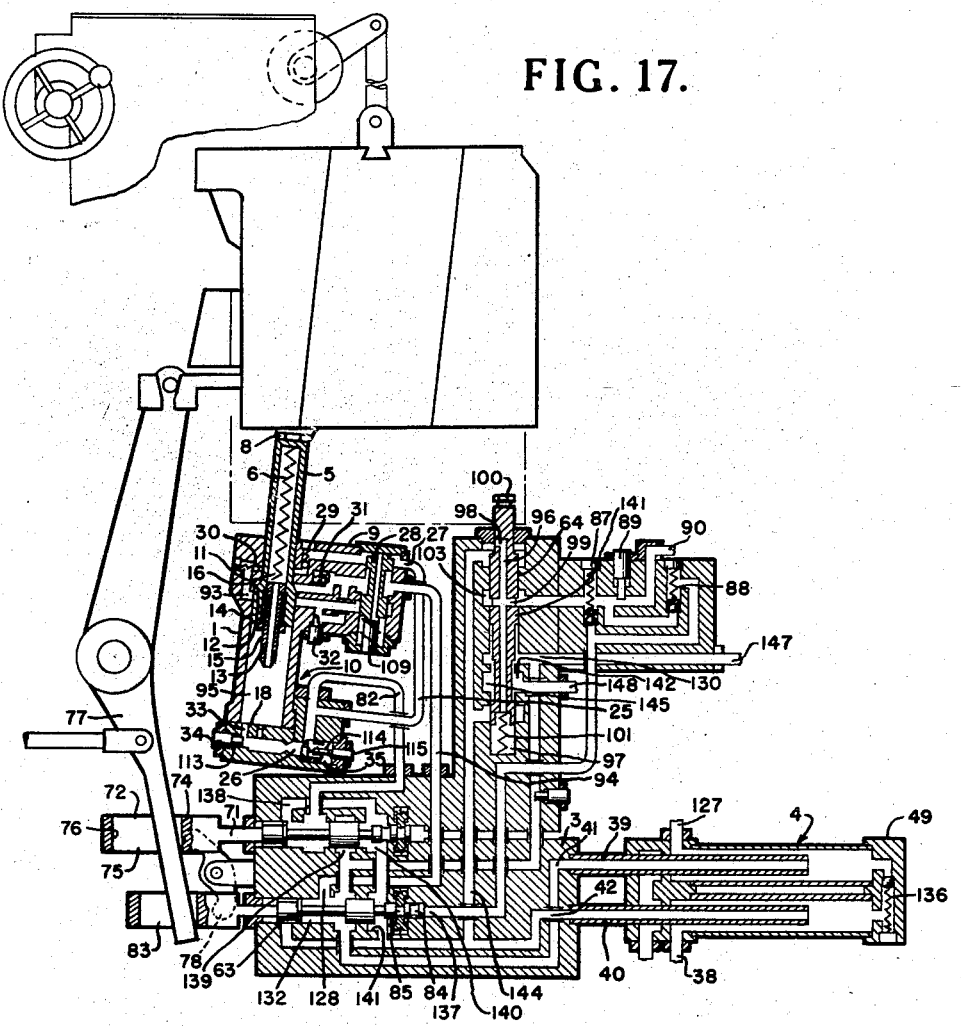
Fig. 17 is an operational diagrammatic illustration of the breech system under manual operation.

The pressure-porting pipe connection for this operating cylinder 37 is that of line 106 which is in fluid communication with the control valve block or pressure regulator of the rammer drive unit as shown at 92 of Fig. 16 and described in greater detail in the copending Wertman application supra. The valve porting arrangement of this connection provides an interlock control function to delay tripping of valve 62 until after the ammunition has been rammed by the chain rammer and the chain head has regressed sufficiently to clear the top of the breechblock. The drain line for this cylinder 37 is shown at 119.

The valve stem 108 of valve 28, functions in the arrangement of Fig. 10 to control piston movement in a manner as will be apparent from Fig. 2. It is initially positioned at the upper position thereof as a result of biasing action of the spring 109 by which it is maintained at all times except when the breech is closing. It is depressed for breech closing action by fluid pressure applied at the upper end chamber 27 of this valve 28. When in this depressed condition it permits free flow to the tank lines of all exhaust fluid displaced by the rising piston rod 5. This displaced flow is exhausted through the port 110 which while closed when the valve stem 108 is up, has unrestricted passage to the tank line through the adjustable restriction element 32 and thence around the intermediate port 111 of valve 28 at a reduced stem portion of 108 to line 94. This passage controls the rate of spring raising movement of the piston and breechblock. This action is accomplished by throttling fluid flow from the upper side of the piston in a manner to decelerate and ease the block to the ramming position thereof without appreciable oscillation.

The piston-type check valve 31 in the upper cylinder head 9 opens to permit unrestricted high-pressure flow for breech opening action. At all other periods, it is spring-seated to securely close the port thereof. Fluid displaced during piston upward movement is thus compelled to flow past the ports 150 and 111 of valve 28 and the adjustable needle element 112 of restriction 32 through the same passage routes as for the hereinbefore described conditions.

The dashpot hole 33 and the restriction element 113 of adjustment 34 in the lower cylinder head 18 function to throttle the fluid displaced by descending piston action with the occurrence of breech opening. This action takes place following closure by the buffer pin 13 of the main port 26 in the cylinder head 18.

The sleeve-type check valve 35 in the lower cylinder head 18 acts in cooperation with the restriction needle 114 of the adjustment 115 associated therewith as an arrangement for controlling the breech closing speed. They act to restrict high-pressure flow to the interior and bottom of the piston.

Figure 11:
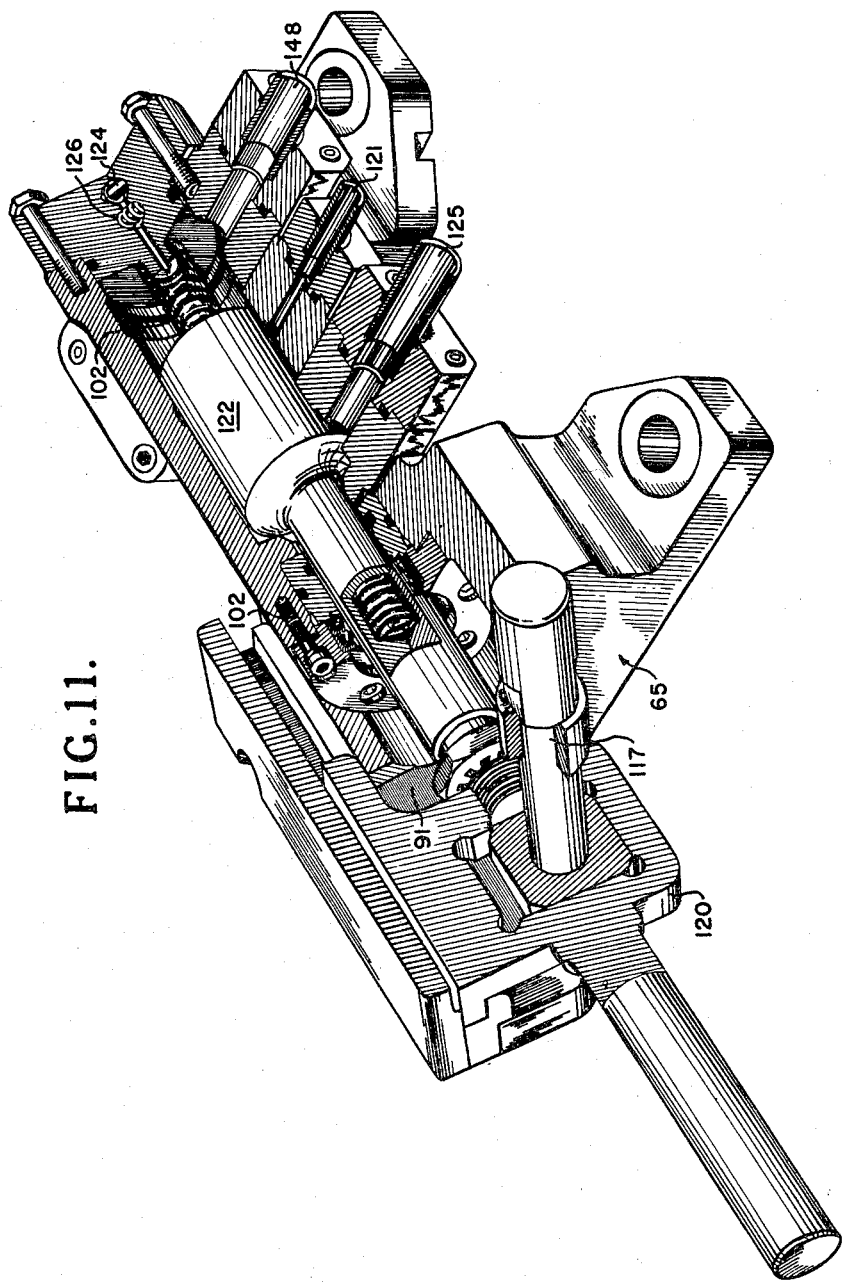
Fig. 11 is a perspective view in section of the extractor cylinder assembly which is controlled by the breech operating valve of Fig. 7.

The extractor cylinders 65 and 66 which are mounted on the top of the gun housing as shown in Fig. 1 are not mechanical elements of the instant invention. These units are however, controlled by the breechblock hydraulic control arrangements. The description thereof which follows is deemed necessary to a complete understanding of the mode of operation of the breech control system. The two units are of similar design as to port connections. Each piston and cylinder assembly is provided with a pivoted extractor spade 116 mounted on the cam roller shaft 117 thereof. The extractor cylinder assemblies as shown in greater detail in Fig. 11 are spring-loaded differential-plunger type hydraulic units which perform the extraction stroke function as a result of initial hydraulic pressure preloading of both sides of the piston. They operate at the desired instant of extraction by controlled opening action of the spring chamber to permit fluid in that chamber to flow to the tank lines.

The cam slide 118, the block 120, and cam roller shaft arrangement 117 at the rear end of the cylinder are constructed and arranged to provide for stroking movement thereof. This arcuate movement when mechanically translated to the toe of the extractor spade 116 produces linear movement from this point at the breech to the end of travel thereof. This action functions to extract the empty case. It will thus be apparent that the pivotal movement of the spade at the roller is changed into a linear movement of nonconstant velocity at the toe as a result of cam slot action.

This extracting stroke occurs when the spring chamber is opened by the action of valve 64 as hereinbefore described. The middle port and the pipe connection through line 90, and the passages which are provided in the block function to provide flow to line 147 for hydraulic shifting of the valve 63. At this position the ports 121, and 123 are uncovered by plungers 122 near the end of the extracting strokes thereof at which position each of the plungers covers the spring chamber exhaust line port to 148 except through the restrictions 124 located in the forward end cover. This restriction serves to decelerate plunger movement.

The return stroke movement of the plunger and extractors is pressure-actuated when hydraulic power is on. Pressure is ported to spring chamber 102 in correlation with rising movement of the breechblock to the ramming position thereof, this position permits valve 64 to rise. The porting of high fluid pressure to this chamber functions to move the plunger against the constant high pressure which is maintained in the rod chamber 125 at all times. The movement of the plunger by application of an equivalent pressure to chamber 102 occurs as a result of the differential area construction thereof, whereby total pressure for plunger movement is less. At the full forward position of the plunger, the initial application of pressure is through ball check passage 126 in the forward end cover. This porting arrangement is required since the piston or plunger is at a position to block fluid flow to the spring chamber and forward face of the plunger. When hydraulic power is off and it is desired to operate the extractors by the manual arrangement provided therefor, the plunger springs at 102 return the extractor spades to the sealed recesses provided in the gun breech.

*Operation*

In the consideration of the operating cycle of the breechblock control and actuation system, reference is made to Figs. 14 to 17 for an operational showing in which a certain few reference characters appear on only one of the figures in view of clarity and due to space limitations thereon, but wherein like reference characters refer to like elements throughout these figures. Let it be assumed that the breechblock is in an open condition and is at a point in the cycle immediately prior to breech closing action. In the closing action of the breech assembly the breech closing valve operating-cylinder 37, Figs. 2 and 16, shifts valve 62 in the breech operating valve block 3 through mechanical linkage 79 when fluid under pressure is ported to the cylinders through line 106. As valve 62 shifts, it allows fluid entering line 127 on the sliding joint 4 to flow across the intermediate port 128 on valve 63, for flow division into two paths, one of which runs to the intermediate port 129 on valve 62, the other of which flows out to the intermediate port 130 of valve 64 as shown in Fig. 16. From the port of valve 62, fluid flows through line 82 to the adjustable flow restriction 35 thence into the bottom of the breech operating cylinder 10.

Fluid flow is also divided above the flow restriction 35 through the upper end of valve 28 to shift this valve to the downward position thereof.

The fluid pressure which acts against the under surfaces of the breech operating piston causes the block to move to the upward position thereof.

Fluid which is displaced from the upper end of the cylinder with upward piston travel flows through the intermediate pair of ports at 111 and 131 on valve 28 into line 94 thence to the outermost port 132 on valve 63 and then through the sliding joint 4 to tank line 38. When the breech is advanced under hydraulic action of piston rod 5 to a nearly closed position the fluid thereabove passes through buffing grooves at 133, Fig. 9, in the piston to buff breechblock final movement. When completely closed the breech is locked by the breech bolt 134 which is moved by action of spring 135. Valve 62 remains detented at the closed position thereof in order to maintain fluid beneath the piston during gun firing and until the breech is again unlocked.

The firing movement positioning of the breech bolt 134 and firing pin, not shown, occurs after the ammunition is rammed, the rammer of the mechanical system retracted, the breech closed and following the movement of the transfer trays of the gun slide system to the firing positions thereof. The firing pin assembly incorporated in the breechblock is not an element of the instant hydraulic system. Attention is directed to the Girouard et al. application supra for a showing thereof. The mention of the above gun system herein is merely for purposes of presenting the operation of the apparatus in a manner providing for a better understanding of the gun operation cycle. At this stage of operation the firing pin moves the breech bolt 134 to close the firing circuit and produce gun firing. Thereafter the gun recoils and subsequently counterrecoils under controlled hydraulic and air action respectively of the recoil cylinder and the counterrecoil assembly. These assemblies as hereinbefore stated also are not elements of the hydraulic system of the instant invention.

As the gun moves in recoil and counterrecoil the sliding joints operate in a telescoping manner to provide oil tight connections between the slide hydraulic system and the hydraulic unit elements of the gun housing. The ball-and-spring type check valve assembly 136 in the sliding joint housing 49 serves to prevent overload pressure on the system during the recoil and counterrecoil of the gun and the value thereof is preset to a safe setting such for example as 1500 p. s. i.

Figure 12:
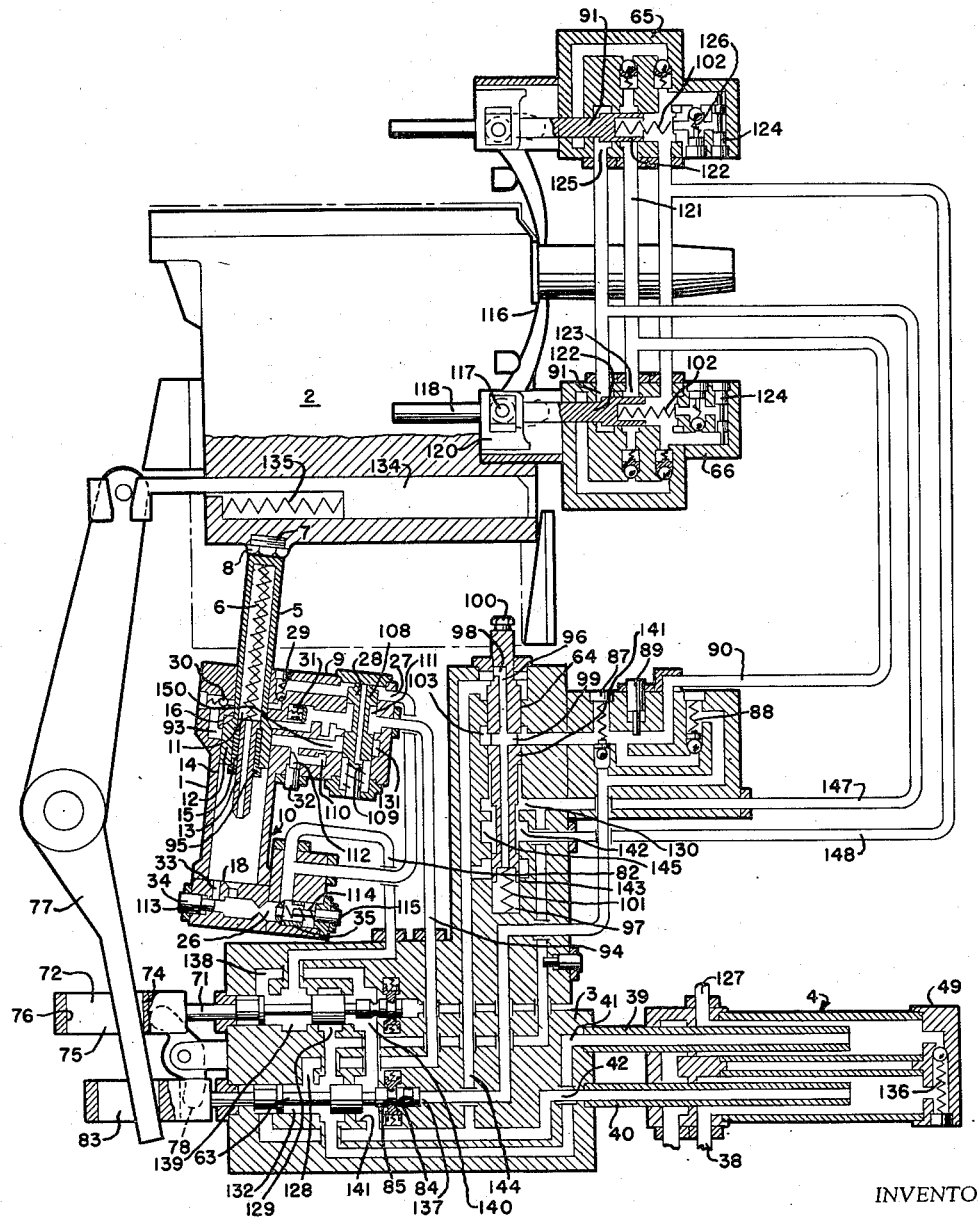
Fig. 12 is a diagrammatic illustration of the breech hydraulic power and control system of Fig. 2 showing normal automatic breech action at the start of breech opening movement.
Figure 18:
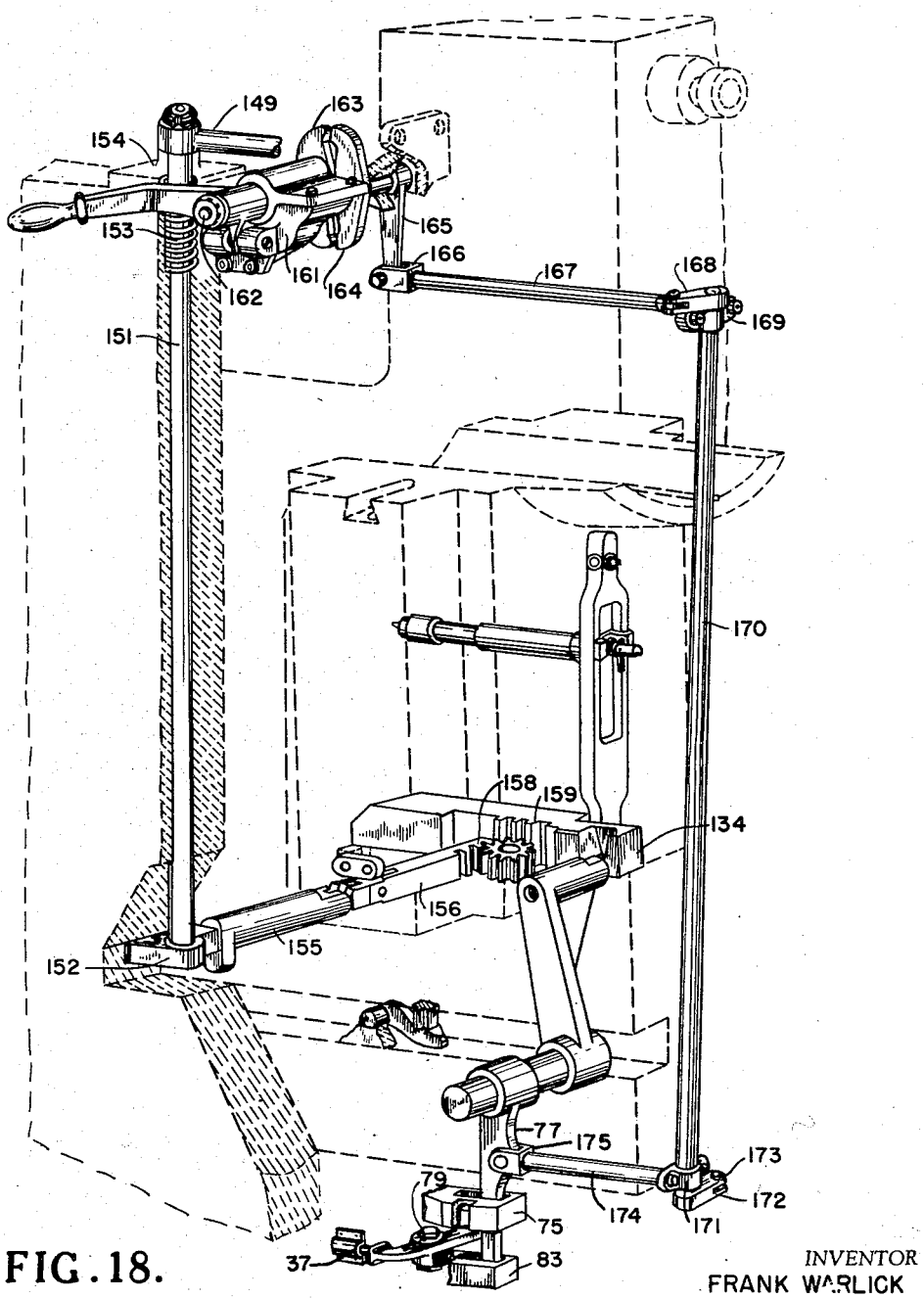
Fig. 18 is a phantom perspective view of the mechanical linkages for manual breech bolt unlatching.

Breech opening action occurs during counterrecoil wherein the breech bolt is retracted by a cam actuated mechanism of the gun mechanical equipment which is located in the gun housing. This retraction of the breech bolt actuates the valve operating lever 77 as shown in Fig. 18, to shift valve 63 to the inner detent position at 85 thereof as shown in Fig. 12. The movement of valve 63 in this action simultaneously moves the valve 62 to the outer detent position at 69 thereof under action of the rocker arm lever connection 78 between the two valves. The outer position of valve 62 prevents high pressure from passing through the intermediate ports thereof. It does, however, open the outer port 138 thereof to relieve pressure in the bottom of the breech operating cylinder. This porting action through the outer and outer intermediate porting sections 138 and 139 respectively of valve 62 permits flow through the intermost porting passage 140 to the inner passage portion 141 of valve 63 and thence to the tank line 38 by way of the sliding joint drain connection.

Shifting action of valve 63 causes fluid entering line 127 on the sliding joint to be ported through the intermediate port 128 on valve 63 into line 94 to the intermediate port 111 on valve 28, over the check valve 31 thereof onto the top of the piston head 12 in the cylinder 1. This application of fluid pressure to the top chamber of the breech operating cylinder causes the breech block to start the downward movement thereof. As the breechblock is lowered under this action, fluid on the lower side of the piston is returned to the tank through an adjustable restriction 34 and line 82 to the outer intermediate port 139 of valve 62. From the outer porting position of the valve spool which connects between the outermost port 138 and the outer intermediate port 139 the fluid flows through the intermost ports 140 and 141 respectively of valves 62 and 63 to the sliding joint 4 and out tank line 38.

Near the end of the lowering stroke of the piston, the return flow to the tank is reduced with movement of the buffer pin 13 to a position in flow restricting relationship with the seat therefor. This action functions to close the interior passage of the piston buffer pin with seating of the pin in the main port at 24 at the bottom of the cylinder. Further fluid displacement with additional piston stroking passes the fluid which is under piston pressure through the adjustable restriction 33. The downward movement of the breech block is thus hydraulically checked in a manner as illustrated in Fig. 13.

Figure 13:
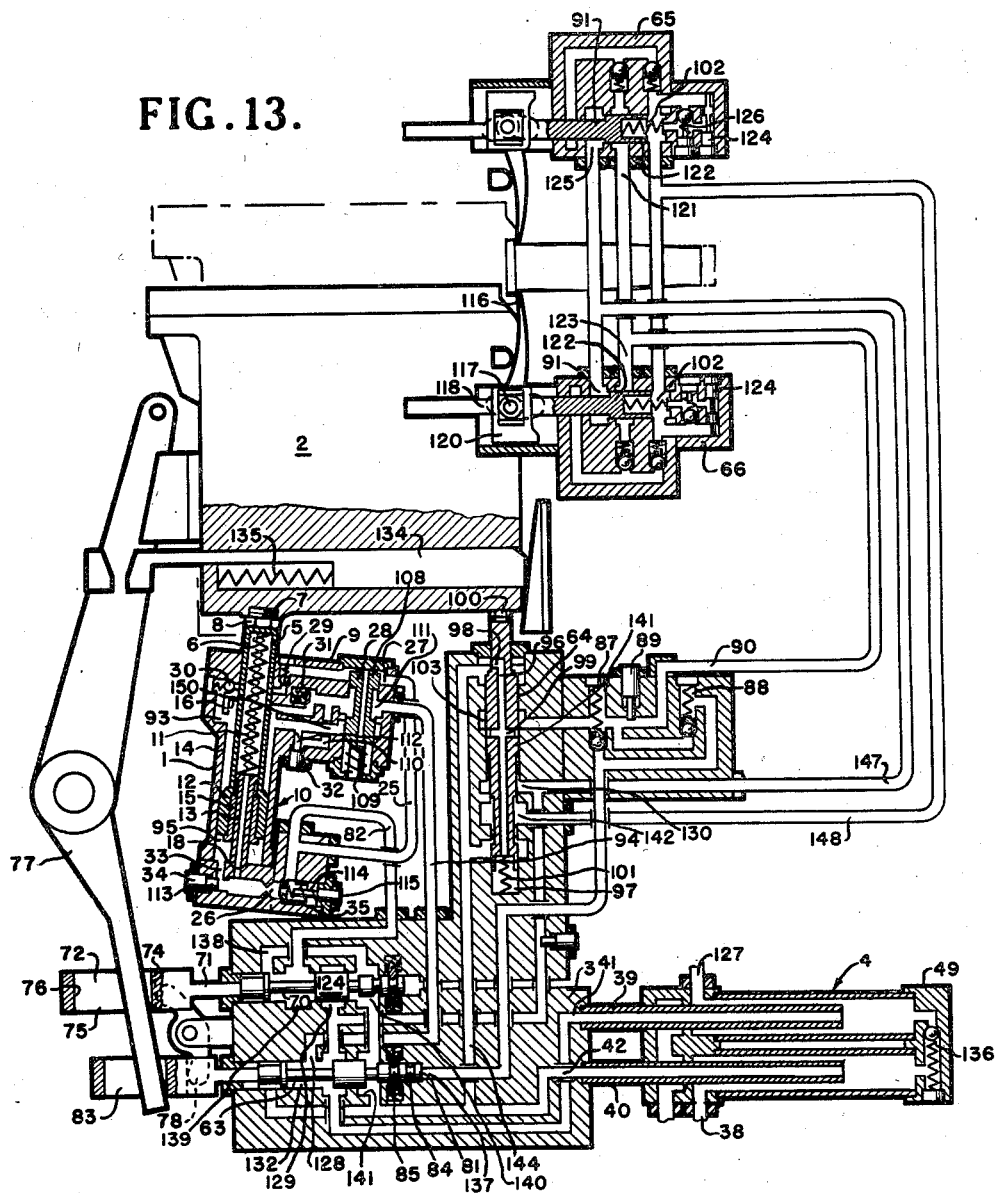
Fig. 13 is a diagrammatic illustration of the breech system and showing system conditions during breech opening movement for automatic breech control and indicating the valve porting actions to lower the breechblock and start empty case extraction.
Figure 14:
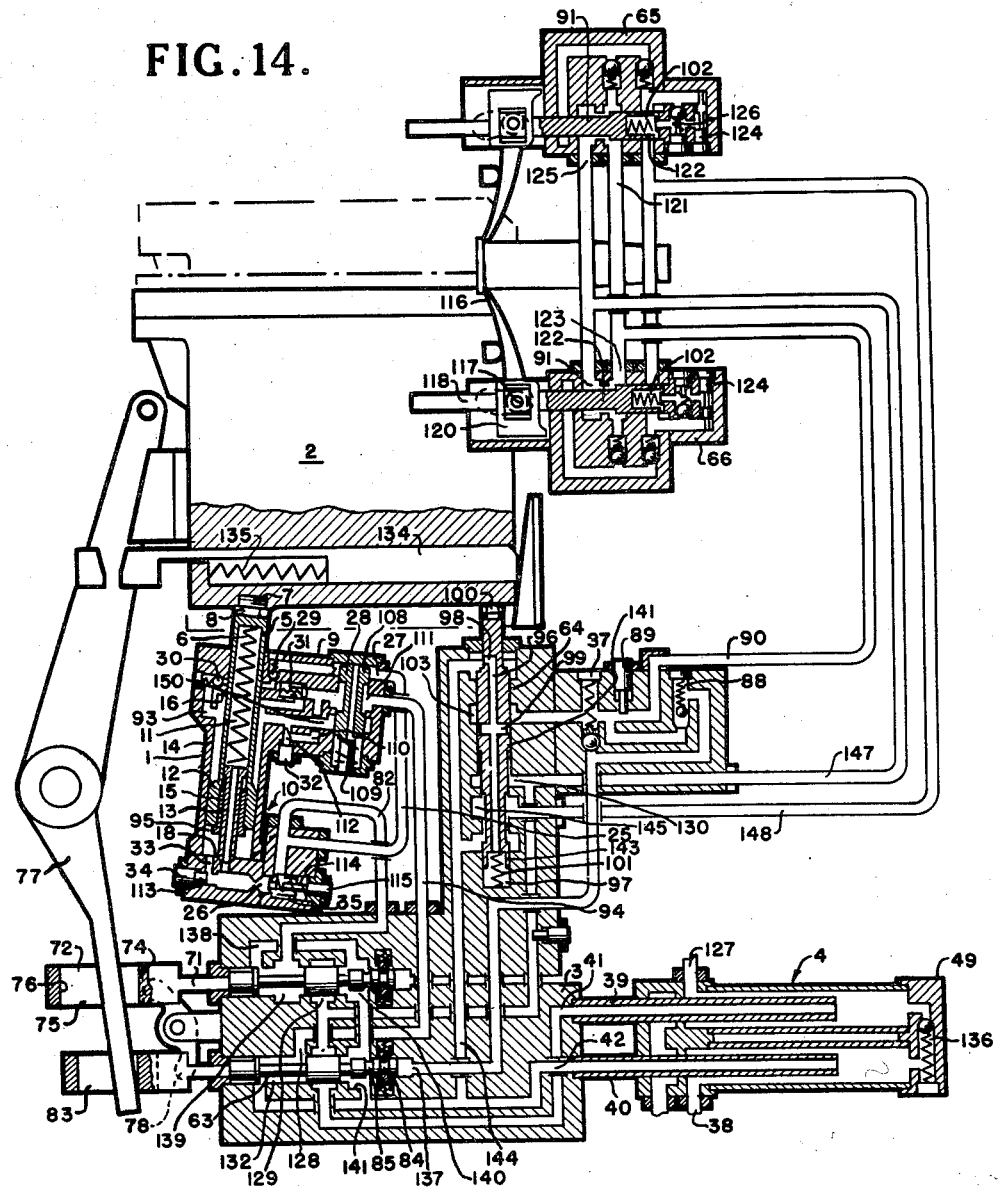
Fig. 14 is an operational diagrammatic illustration of the character of Figs. 12 and 13 during the next succeeding phase of the automatic breech operation cycle during empty case extraction with breechblock movement to ramming position for the gun slide.
Figure 15:
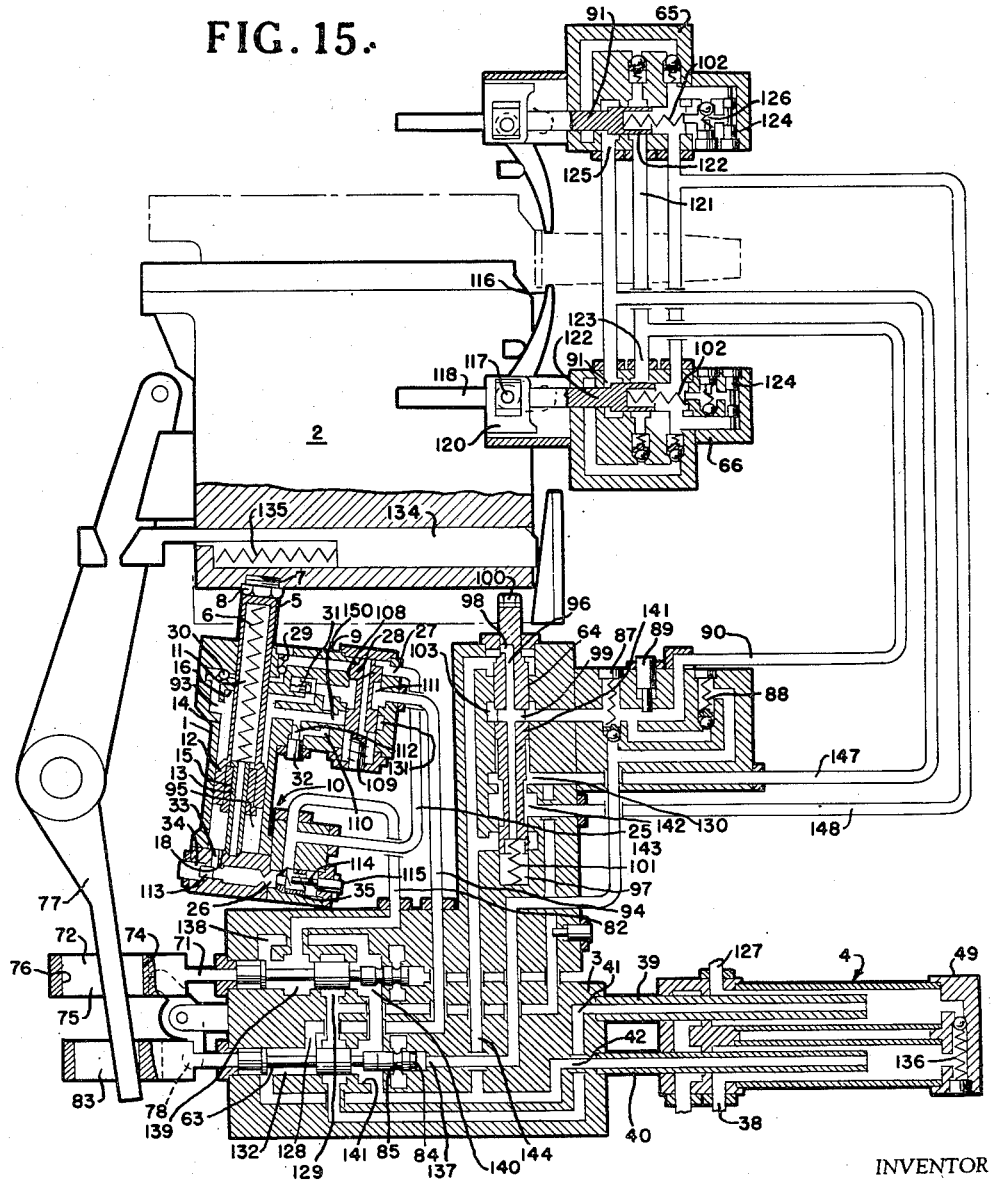
Fig. 15 is an additional operational diagrammatic illustration showing the breechblock at ramming position and valve actions for porting hydraulic fluid to return the extractor cylinders of Fig. 11 to normal position.

The actions of the empty case extractor units which are associated with the breech control system are such that the case extractor spades 116 produce linear movement of the empty case to a position rearwardly thereof after firing and following lowering of the breech block to the position shown in Fig. 13. In this position the breech block 2 makes contact with the extractor valve stem at 100 of valve 64 and moves the valve spool 141 downwardly. The movement of valve 64 to this downward position opens the inlet side 142 for line 148 at the lowermost porting portion 143 of this valve to provide for flow from the case extractor cylinders to the porting passage 144 which is in communication through the sliding joint 4 with the tank line 38. This action vents the forward end at 102 of both extractor cylinders. High pressure on the opposite end chambers at 125 of each of the extractor cylinders acts on the rod ends 91 and 92 of the piston thereof to cause the pistons to move forwardly for operational action of the two spades 116. This spade action extracts the empty case rearwardly and injects it into the empty case tray of the gun mechanical system. As the pistons approach their positions of maximum extraction stroke, the center ports at 121 of the cylinders are closed or covered and the fluid remaining therein and interiorly of the piston spring recess at 102 is displaced through the restriction 124 in the end of the cylinder. This provides an action which buffs the final piston movement. During this portion of the piston stroke, the fluid is ported through branch lines at 121 to line 90 and the spring loaded check valve 88 in the valve block 3 to provide flow to the end chamber 81 of valve 63. This action as shown in Fig. 14 shifts valve 63 to the outer position thereof. This shifting action vents the upper end at 16 of the breech operating cylinder 1. The breech block 2 is then raised to the loading position thereof which is, for example, 12″ below its closed position. This action takes place through the energy stored by the springs 6 and 11 of the breech operating cylinder piston. During this movement flow from the upper side of the piston is restricted as the result of valve action of valve 28 which has shifted upwardly through spring action of 109 to a blocking position for the port 131 thereof, so that all fluids from the upper side of the piston must flow past the needle 112 of the adjustable restriction 32 therepreceding. Flow is through the intermediate port 111 on valve 28 into line 94, to the outermost ports 128 and 132 on valve 63 into the return line 38 of the sliding joint 4. This short upward movement of the breech block 2 brings the upper surface thereof into alignment with the ramming position for the transfer trays, and simultaneously therewith allows the extractor valve 64 to be returned to normal position shown in Fig. 15. This occurs by spring action of 101 and by pressure acting on the differential areas above and below the intermediate port 145 of this valve. Return of this valve to the normal position thereof restores pressure to the forward end at 102 of the extractor plunger 122. This causes the extractor pistons to be returned to their normal loading position, which occurs due to the effect of the differential in the area between the forward and rear surfaces of the extractor piston.

The hereinabove description of the mode of operation of the breech hydraulic system is applicable when the system is under automatically controlled hydraulic actuation. The system may, however, be operated manually in the event of power shutdown or hydraulic failure. In such instances, it is necessary, in order to manually open and close the breech by the hand wheel drive therefore, Fig. 17, and manually operate the extractor spades by insertion of a hand lever actuator, that the hydraulic cylinder be unblocked to permit free displacement of fluid therein. Prior to this hydraulic power release action, the breech cylinder fluids are released by opening the manually operated by-pass valve in the pump control valve block as described in greater detail in the copending Wertman application S. N. 502,536 supra. As this by-pass is open, the fluid displaced by the breech operating cylinder has unrestricted flow through the system connections to the tank line. Similar unrestricted flow is provided for manual spade actuation whereby the fluid pressure decay at the extractor cylinder chambers permits actuation by suitable manual lever means upon insertion thereof in a linkage socket member of the spade operator, not shown.

The manual breech system operating devices for unlocking and locking the breech and for resetting the breech control valves are shown in Fig. 18. They comprise the manual breech bolt release operating lever 149, and the manual breech locking and valve resetting hand operating lever 160. The hand lever 149 is spline connected to a spring loaded shaft 151 for operation of a manual breech bolt release cam 152. The spring 153 which is interposed between pin carried in a hole in the shaft, not shown and the mounting bracket 154 functions to return the lever to the normal position thereof. The cam 152 actuates the outer release bar 155 on the gun housing to in turn actuate the inner release bar 156 in the breechblock 134 for rotation of the release pinion 157. This pinion 157 engages rack teeth 158 and 159 on the release bar and breech bolt respectively to withdraw the bolt 134 when lever 149 is actuated.

The lever 160 is carried by lever bracket 161 on the slide and is spline connected to a cam shaft 162 of cam 163 for movement against the operating lever cam 164 which is spline connected to actuate the cam lever 165. This lever 165 is clevis connected at 166 to the upper connecting rod 167 for movement of the pivotally connected lever 168. The lever 168 is connected to shaft 170 which is rotatable in the brackets 169 and 171 which are mounted on the breech housing.

The lower end of shaft 170 functions to move a lower lever 172, which is connected by a clevis type connection at 173 to the lower connecting rod 174. The lower connecting rod 174 is terminated in a clevis 175 which is mounted by a pin 176 to the valve operating lever 77.

The functioning of the lever system actuated by 160 is such that when the gun is in battery, the two cams 163 and 165 are separated by a small clearance, although disposed in a manner whereby cam 165 may be actuated by cam 164 when lever 160 is actuated in either an upward or downward direction. The hand lever 160 has limited movement in two directions such that upward movement thrusts the breech bolt forward, while downward movement functions to reset the valves. When released, the lever 160 is returned to a neutral position thereof by spring centering plungers not shown. This lever does not move when the breech bolt and the valve 63 move during automatic gun operation.

Obviously many modifications and variations of the present invention are possible in the light of the above teachings. It is therefor to be understood that within the scope of the appended claims the invention may be practiced otherwise than as specifically described.

What is claimed as new and desired to be secured by Letters Patent of the United States is:

1. In a rapid fire gun and housing assembly provided with breechblock ways, a breechblock movable in said ways to cover and uncover the breech opening of the gun, a breechbolt for locking said breechblock in a closed position, a push-pull type breech operating hydraulic cylinder having a piston therein connected to the bottom of said breechblock, said cylinder being connected to the bottom of the housing for providing sliding breech movement in said ways, valve means responsive to completion of gun ramming and completion of empty case ejection for controlling push-pull motion of said breech operating cylinder respectively for raising and lowering of the piston thereof, means including a pilot valve for controlling the positioning of said valve means for maintaining closing pressure on the breechblock in closed position to minimize friction between the breechblock and breechbolt during movement of the breechbolt after breech closing and for unlocking prior to breechblock opening action, throttling means on said piston and cooperative with said breech operating cylinder for buffing travel of the piston following breech closing while thereafter maintaining constant closing pressure on the breechblock during gun firing.

2. A breech operating system for a rapid-fire large bore gun of a character comprising a breechblock having a breech bolt therein, a bi-directional hydraulic breechblock operating cylinder, a piston in said operating cylinder, hydraulic control means including a plurality of valves for initiating actuation and providing control of said cylinder, a source of hydraulic pressure, means including a valve for automatically maintaining breech closing pressure on the closed breechblock by said cylinder before, during and after gun firing thereby to substantially eliminate the effect of friction normally encountered at breech bolt locking and unlocking respectively after closing action and before breech opening action of said cylinder.

3. A breech control system of claim 2 further characterized by the inclusion of a system of mechanically interacting levers on first and second ones of said plurality of valves of said control means, a manual lever for initiating manual breechblock lowering actuation by positioning of said first valve of said control means for breech lowering by manually actuating said second valve by the interacting lever therefor without adversely altering the subsequent hydraulic operation of the control means.

4. A breech control system for the breechblock of a major caliber gun for providing lowering and raising movement of the breechblock prior to and after gun firing, which comprises a gun housing and gun assembly, a breechblock mounted for movement in said housing, a breechbolt slideably mounted in said breechblock and disposed for movement into locking engagement with said housing at the breech closing position of said breechblock, a two-way hydraulic cylinder and piston assembly connected for movement of said breechblock in opening and closing action with respect to the gun breech, a control system comprising a plurality of valve means disposed in a hydraulic circuit for automatic directional control of hydraulic fluid flow to said hydraulic cylinder and for maintaining closing pressure on said breechblock to minimize friction with the breechbolt during movement thereof after breech closing and for unlocking prior to breechblock opening action, a first valve means in said control system for providing automatic actuation for breechblock lowering by the piston of said cylinder in response to and following unlocking of said breechbolt, means responsive to gun recoil for unlocking said breechbolt and actuating said first valve means, a pair of bi-directional hydraulic case extractor cylinders, a pair of case extractor spade elements connected to respective ones of said extractor cylinders, and an extractor valve control means disposed in the path of travel of said breechblock for actuation by the breechblock only upon completion of the lowering action thereof thereby to initiate hydraulic actuation of said extractor cylinders, a second control valve means for effecting repositioning of said first valve means after completion of extractor cylinder actuation for providing flow direction reversal of the control for said two-way hydraulic cylinder thereby to provide for subsequent automatic breech closing.

References Cited in the file of this patent

UNITED STATES PATENTS 2,410,116   Vickers _____ Oct. 29, 1946